(12) United States Patent
Motoyama

(10) Patent No.: US 10,798,078 B2
(45) Date of Patent: Oct. 6, 2020

(54) SYSTEM FOR USING LOGIN INFORMATION AND HISTORICAL DATA TO DETERMINE PROCESSING FOR DATA RECEIVED FROM VARIOUS DATA SOURCES

(71) Applicant: Tetsuro Motoyama, Los Altos, CA (US)

(72) Inventor: Tetsuro Motoyama, Los Altos, CA (US)

(73) Assignee: RICOH COMPANY, LTD., Tokyo (JP)

( * ) Notice: Subject to any disclaimer, the term of this patent is extended or adjusted under 35 U.S.C. 154(b) by 438 days.

(21) Appl. No.: 15/476,525

(22) Filed: Mar. 31, 2017

(65) Prior Publication Data

US 2017/0255649 A1  Sep. 7, 2017

Related U.S. Application Data

(62) Division of application No. 15/062,857, filed on Mar. 7, 2016, now abandoned.

(51) Int. Cl.
*H04L 29/06* (2006.01)
*G06F 16/22* (2019.01)
(Continued)

(52) U.S. Cl.
CPC .............. *H04L 63/08* (2013.01); *G06F 9/445* (2013.01); *G06F 9/44505* (2013.01);
(Continued)

(58) Field of Classification Search
CPC ... H04L 12/1428; H04L 63/08; H04L 63/102; G06Q 30/04; G06F 9/44505; G06F 21/12;
(Continued)

(56) References Cited

U.S. PATENT DOCUMENTS 7,456,988 B2  11/2008  Stevens
2006/0095372 A1*  5/2006  Venkatasubramanian ...................
G06Q 20/102
705/40
(Continued)

FOREIGN PATENT DOCUMENTS

EP  2 808 808 A2  12/2014

OTHER PUBLICATIONS

Kelly Van, et al., "Managing Data-Based Systems Across Releases Using Historical Data Dictionaries", Bell Labs Technical Journal, Wiley, CA, dated May 1, 2000, pp. 131-133.
(Continued)

*Primary Examiner* — David T. Brooks
(74) *Attorney, Agent, or Firm* — Hickman Palermo Becker Bingham LLP; Malgorzata A. Kulczycka

(57) ABSTRACT

In an embodiment, upon receiving access credentials from a first entity, first information about the first entity is retrieved and used to determine a first service and a first service category of the first service provided by a first service provider to the first entity in the past. Based on the first service category, one or more first sub-categories associated with the first service are determined. Upon determining electronic data characteristics of received electronic data, it also is determined whether any of the electronic data characteristics matches one or more first sub-category characteristics of any of the one or more first sub-categories associated with the first service. If so, based on, at least in part, the electronic data, an updated first sub-category for the first sub-category associated with the first service is generated and transmitted to the first service provider for processing.

20 Claims, 18 Drawing Sheets

(51) Int. Cl.
*G06F 16/25* (2019.01)
*G06F 16/28* (2019.01)
*G06F 16/583* (2019.01)
*G06F 9/445* (2018.01)
*G06F 21/12* (2013.01)
*G06F 21/62* (2013.01)
*G06F 21/44* (2013.01)
*G06T 5/00* (2006.01)

(52) U.S. Cl.
CPC ............ *G06F 16/22* (2019.01); *G06F 16/258* (2019.01); *G06F 16/285* (2019.01); *G06F 16/583* (2019.01); *G06F 16/5846* (2019.01); *G06F 21/12* (2013.01); *G06F 21/44* (2013.01); *G06F 21/6218* (2013.01); *G06T 5/002* (2013.01); *H04L 63/102* (2013.01)

(58) Field of Classification Search
CPC ...... G06F 21/6218; G06F 21/44; G06F 9/445; G06F 16/22; G06F 16/258; G06F 16/285; G06F 16/583; G06F 16/5846; G06T 5/002
See application file for complete search history.

(56) References Cited

U.S. PATENT DOCUMENTS

| | | | |
|---|---|---|---|
| 2006/0282442 A1* | 12/2006 | Lennon | G06K 9/00442 |
| 2007/0097420 A1 | 5/2007 | Shah | |
| 2007/0162456 A1* | 7/2007 | Agassi | G06Q 10/10 |
| 2007/0236562 A1 | 10/2007 | Chang | |
| 2008/0144068 A1 | 6/2008 | Digby | |
| 2010/0332428 A1 | 12/2010 | Mchenry et al. | |
| 2011/0137908 A1 | 6/2011 | Dom | |
| 2011/0295727 A1* | 12/2011 | Ferris | G06Q 40/12 |
| | | | 705/34 |
| 2011/0313896 A1* | 12/2011 | Nuggehalli | G06K 9/00993 |
| | | | 705/30 |
| 2012/0164972 A1* | 6/2012 | Shim | H04W 24/02 |
| | | | 455/405 |
| 2013/0167196 A1* | 6/2013 | Spencer | H04W 8/22 |
| | | | 726/3 |
| 2013/0198072 A1* | 8/2013 | Piratla | G06Q 40/02 |
| | | | 705/43 |
| 2013/0304773 A1* | 11/2013 | Ponnavaikko | G06Q 40/02 |
| | | | 707/825 |
| 2013/0339362 A1 | 12/2013 | Yang | |
| 2014/0029028 A1* | 1/2014 | Fallon | G06F 3/1204 |
| | | | 358/1.9 |
| 2014/0032259 A1* | 1/2014 | LaFever | G06Q 30/0201 |
| | | | 705/7.29 |
| 2014/0188756 A1* | 7/2014 | Ponnavaikko | G06K 9/00449 |
| | | | 705/342 |
| 2014/0188889 A1* | 7/2014 | Martens | H04L 67/22 |
| | | | 707/740 |
| 2014/0280335 A1 | 9/2014 | Bilange et al. | |
| 2014/0337345 A1* | 11/2014 | Motoyama | G06F 3/0604 |
| | | | 707/738 |
| 2014/0359506 A1* | 12/2014 | Shimizu | G06F 16/287 |
| | | | 715/769 |
| 2015/0178699 A1* | 6/2015 | Wada | G06Q 10/06 |
| | | | 705/40 |
| 2015/0248419 A1 | 9/2015 | Motoyoama | |
| 2015/0365469 A1* | 12/2015 | Procopio | G06F 8/60 |
| | | | 709/217 |
| 2016/0239534 A1* | 8/2016 | Evans | G06F 9/445 |
| 2016/0315825 A1* | 10/2016 | Fix | H04L 67/306 |

OTHER PUBLICATIONS

European Patent Office, "Search Report" in application No. 17156666.4-1954, Filed Jul. 13, 2017, 10 pages.

* cited by examiner

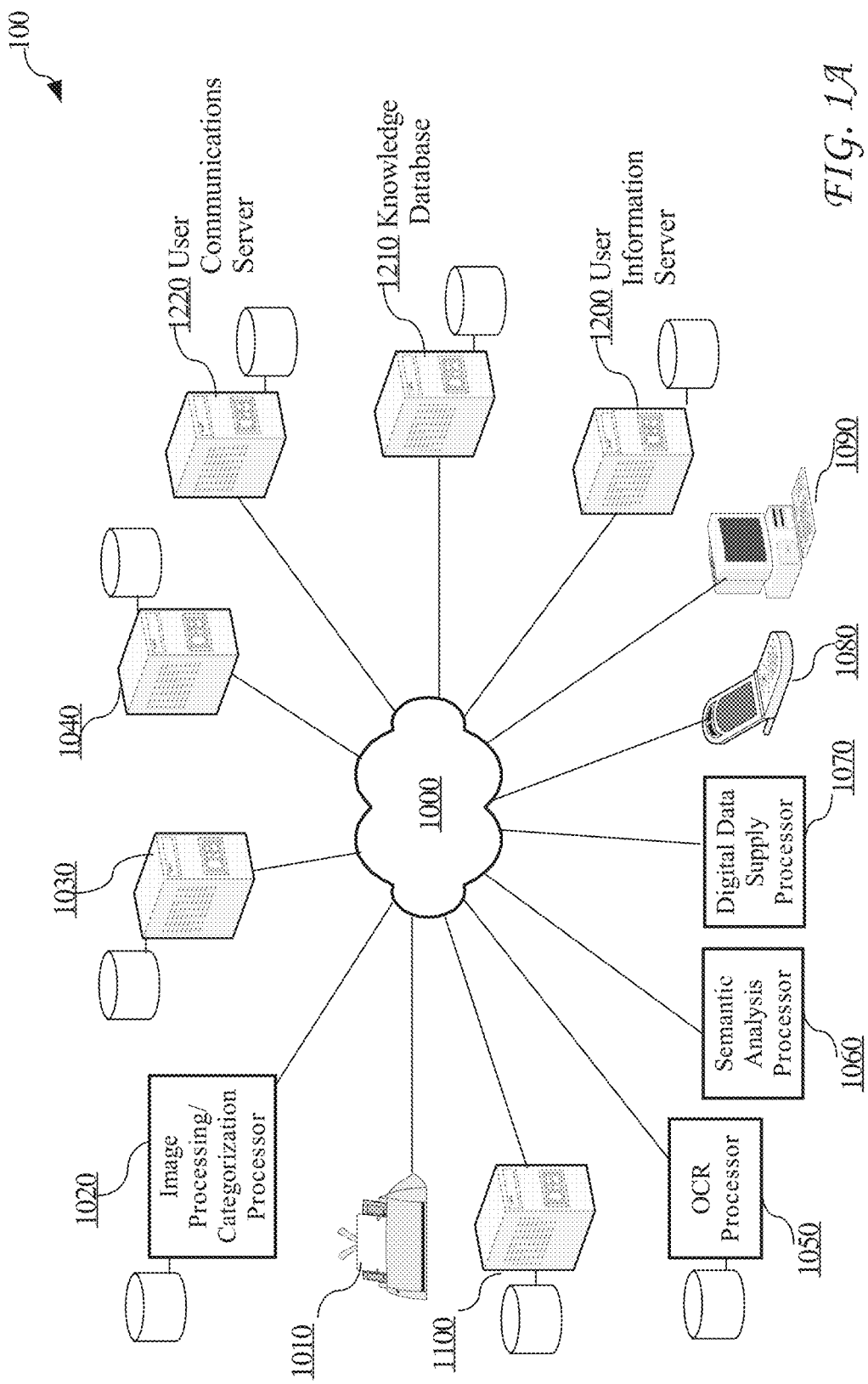

SYSTEM FOR USING LOGIN INFORMATION AND HISTORICAL DATA TO DETERMINE PROCESSING FOR DATA RECEIVED FROM VARIOUS DATA SOURCES

BENEFIT CLAIM

This application claims the benefit under 35 U.S.C. § 120 as a divisional of application Ser. No. 15/062,857, filed Mar. 7, 2016, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

Embodiments relate generally to processing data received from various data sources, and more specifically, to using login information and historical data to determine the applications for processing the data received from both external and internal sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Technological advances in data processing have a profound impact on the way business associations conduct business. While in the past, the documents were usually docketed and processed manually, currently, the docketing and processing of the documents may be at least partially automated. For example, invoices may be received via e-mail, the received invoices may be scanned using a scanner, and digital data generated by the scanner may be automatically transmitted from the scanner to a company processing center.

However, because the data may be received from a variety of data sources and may be represented in a variety of data formats, the received data usually needs to be processed by a specialized software application. In fact, some received data may require processing by two or more specialized applications, each of which may be selected based on many factors. For example, the specialized applications may be selected based on a data format in which the data is represented or based on a file extension of the file in which the data is saved.

SUMMARY

An apparatus is provided for using login information received from an entity and historical data stored for the entity in a knowledge database to determine the type of processing for electronic data received from the entity.

The apparatus comprises one or more memory units and one or more processors. The memory stores one or more sequences of instructions which, when executed by the one or more processors, cause receiving access credentials and electronic data from a first entity.

Access credentials are used to determine whether a knowledge database contains first information about a first entity. If the knowledge database contains the first information about the first entity, then the first information is used to determine a first service and a first service category, of one or more categories, of the first service provided by a first service provider to the first entity in the past. The first service category is used to determine one or more first sub-categories associated with the first service.

One or more electronic data characteristics of the electronic data are determined. The electronic data characteristics are used to determine whether any of the electronic data characteristics of the electronic data matches one or more first sub-category characteristics of any of the one or more first sub-categories associated with the first service.

In response to determining that a first electronic data characteristic, of the one or more electronic data characteristics of the electronic data, matches a first sub-category characteristic, of one or more first sub-category characteristics of a first sub-category of the one or more first sub-categories associated with the first service, at least the electronic data received from the entity is used to generate an updated first sub-category for the first sub-category.

The updated first sub-category is stored in the knowledge database in association with the first service. Content of the updated first sub-category is transmitted to the first service provider for processing.

BRIEF DESCRIPTION OF THE DRAWINGS

In the figures of the accompanying drawings like reference numerals refer to similar elements.

FIG. 1A is a block diagram that depicts an example of processing environment for processing data received from various data sources.

DETAILED DESCRIPTION

Figure 1B:
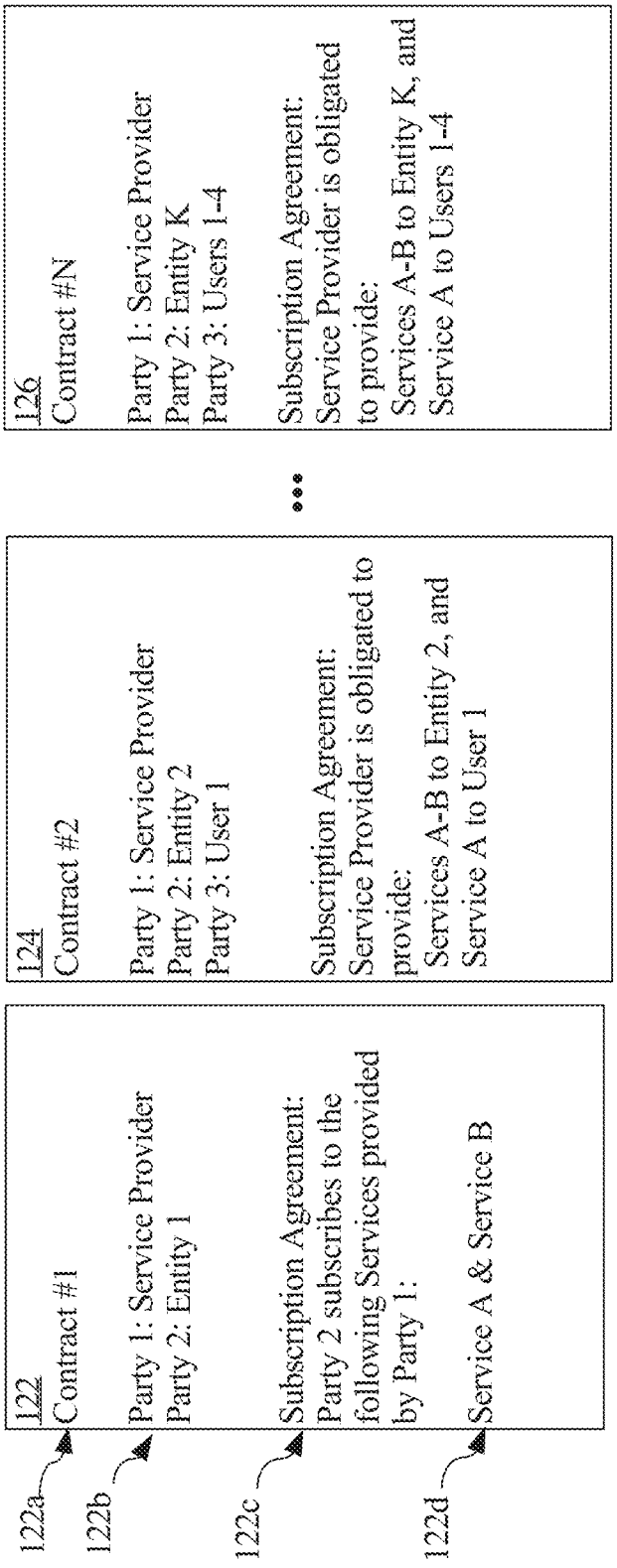
FIG. 1B is a block diagram that depicts examples of subscription assignments.

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

I. OVERVIEW
II. SYSTEM ARCHITECTURE
III. SUBSCRIPTION ASSIGNMENTS
IV. RELATIONS BETWEEN SERVICE PROVIDERS AND ENTITIES
V. ASSOCIATIONS BETWEEN ENTITIES AND USERS
VI. KNOWLEDGE DATABASE
VII. CREDENTIALS PROCESSING
VIII. DETERMINING CATEGORIES FOR RECEIVED ELECTRONIC DATA
   A. Information About an Entity Present in a Knowledge Database
   B. Information About an Entity not Present in a Knowledge Database
IX. DATA FORMATS
X. IMAGE PROCESSING/CATEGORIZATION PROCESSOR
XI. PROCESSING DATA RECEIVED FROM VARIOUS DATA SOURCES
   A. Introduction
   B. Image Processing and Categorization
   C. Process Modifications
   D. Example of Processing Invoice Data Received from a Data Source
   E. Category Editor
   F. Training Process
XII. IMPLEMENTATION MECHANISMS I. Overview An apparatus is provided for determining the type of processing for electronic data received from an entity. The determination is made based on login information provided by the entity and based on historical data stored for the entity in a knowledge database of a data processing system. Non-limiting examples of entities include a company, an organization, a subscriber, and the like. The login information may be provided to the data processing system as a user or a customer logs in to a portal of the data processing system on behalf of the entity. The data processing system may use login information and historical data stored for the entity to determine the type of processing for the electronic data received from the entity. The processing may include providing one or more services by one or more service providers capable of processing the electronic data received from the entity.

A type of processing or service suitable for processing electronic data received from an entity may be determined based on historical data stored in a knowledge database. The historical data may include contractual obligations between the entity and one or more service providers, and/or information indicating the services that the entity requested in the past. For example, the login information received from a first entity and historical data stored in the knowledge database for the first entity may be used to determine a service that may be performed on electronic data received from the first entity. If such a service is determined, then the electronic data received from the first entity may be directed to a service provider that is either contractually obligated to provide that service to the entity, or that is capable of providing that service to various entities. Alternatively, the entity or a user from the entity may specify the desired service when more than one services are available.

Login information may include access credentials provided by an entity that requests access to a data processing system. Login information may be used to determine whether the entity is authorized to access the data processing system. If the authorization of the entity to the data processing system is successful, then the login information and contents of a knowledge database may be used to determine one or more services that may be provided to the entity.

The services that may be provided to an entity may be specified in a knowledge database. A knowledge database may store, for example, information about contracts identifying contractual obligations between entities and service providers. A knowledge database may also store information about the services that each of the entities may request from particular service providers. For example, a knowledge database may include information that specifies that a first entity subscribed to one or more services provided by a first service provider. Hence, upon receiving login information and electronic data from the first entity, the login information of the first entity may be used to determine whether the first information about the contractual obligations between the first entity and any service provider is stored in the knowledge database, and if so, whether the electronic data received from the first entity may be processed using one or more services provided by one or more service providers. If this test leads to identifying a first service and a first service provider, then the electronic data received from the first entity may be transmitted to the first service provider to perform the first service with respect to the electronic data.

However, if, based on access credentials received from an entity, no contract information or historical data for the entity may be identified in a knowledge database, then characteristics of electronic data received from the entity may be compared to characteristics of other services specified in the knowledge database. If a match between the characteristics is found and a second service is identified, then an attempt is made to transmit the received electronic data to a service provider that is capable of providing the second service to the entity.

But, if that attempt fails, then the electronic data received from an entity is further parsed and analyzed to determine the type of processing that may be applicable to the electronic data even though a knowledge database does not have historical information for the entity. The received electronic data may be analyzed to determine, for example, whether the received data contains invoice data, and if so, whether the received data may be processed by a service provider that is capable of processing invoices. Upon determining that a particular service provider is capable of the invoice data received from the entity, the received electronic data is transmitted to the particular service provider. For example, if the received electronic data includes invoice information and an identification of a vendor that can process invoices, then the received electronic data may be transmitted for processing to the identified vendor.

II. System Architecture

FIG. 1A is a block diagram that depicts an example of data processing environment 100 for processing data received from various data sources. In an embodiment, data processing environment 100 comprises a user information server 1200, a knowledge database 1210, a user communications server 1220, a multifunction peripheral device (MFP)/scanner 1010, an image processing/categorization (IPC) processor 1020, application servers 1030 and 1100, a digital data server 1040, an OCR processor 1050, a semantic analysis processor 1060, a digital data supply processor 1070, a mobile device 1080, and a workstation 1090. Devices 1010-1220 are merely examples of the devices that may be part of processing environment 100. Devices not depicted in FIG. 1A may include digital cameras, data sensors, video signal generating and emitting devices, and others. The devices may communicate with each other via a cloud system 1000.

User information server 1200 may be implemented in a server device and configured to store information about various entities. Examples of the entities may include companies, users, groups of companies, groups of users, and the like. Information about an entity may include information about access credentials granted to the entity and a procedure to authorize the entity to the data management system. The information may also specify one or more services that the entity is allowed to request. The information may further specify one or more service providers that are contractually obligated to provide services to the entity. For example, user information server 1200 may store information about a first entity, access credentials of the first entity, one or more services that the first entity is allowed to request, one or more service providers that are contractually obligated to provide services to the first entity, one or more services that the first entity received without having contracts with service providers in the past, and other information specific to the first entity.

Knowledge database 1210 may be implemented in a server device and configured to store information received from various entities and various sources. For example, knowledge database 1210 may store information about contracts binding various entities with various service providers and information specifying subscriptions between the entities and the service providers. The stored information may include the information used to assist the classification of categories, such as service categories, template categories, and the like. Knowledge database 1210 may store historical data of individuals and companies in a compact form, thus enabling an efficient data mining, and input data categorization. For example, the information about the input categories may be aggregated based on users' or entities' identifiers, and aggregation of the stored information allows increasing the accuracy of the data mining process and the data modification process. Knowledge database can be implemented using a big data technology such as Hadoop and associated techniques.

Knowledge database 1210 may also include information about additional services that can be provided by various services providers even if no corresponding contract information is available. Furthermore, knowledge database 1210 may include history logs of the services that the entities requested from the service providers in the past, history logs of the service providers that the entities dealt with in the past, history logs of the entities that were provided certain services in the past, history logs of the service providers that provided certain services to certain entities, and the like.

Knowledge database 1210 may be built prior to being deployed in data processing environment 100, and then updated as information about new entities, new contracts, new services and new service providers are added to data processing environment 100. Alternatively, knowledge database 1210 may be built as data processing environment 100 is deployed and as requests for services are received from the entities. As new requests for services and information about new contracts are received, knowledge database 1210 may be updated and modified. For example, if a particular contract between a particular entity and a particular service provider for providing a particular service to the particular entity is modified, the modifications to the contract may be used to update knowledge database 1210. Furthermore, if a particular contract is cancelled or expired, the knowledge database 1210 may be updated accordingly.

User communications server 1220 may be implemented in a server device and configured to provide communications channels between user information server 1200, knowledge database 1210, user communications server 1220 and other components of data processing environment 100. User communications server 1220 may, for example, facilitate communications between users and data processing environment 100. For example, user communications server 1220 may be configured to generate a graphical user interface (GUI) for a user, display the GUI on a display device for a user, and receive user input from the user via the GUI.

User communications server 1220 may also be configured to generate and transmit messages to entities and users, allow setting users' and entities' preferences, and transmit notifications to the users and entities. The messages may be sent from user communications server 1220 if a form of an email or a text to a cell phone or a tablet.

User communications server 1220 may also support interactions between users and software applications and software tools. For example, user communications server 1220 may provide support for the interactions between users and data processing environment 100 via applications executed on a cell phone, a tablet, and the like.

MFP 1010 may be configured to print electronic documents, scan printed documents, generate digital data for the scanned documents, and otherwise process jobs sent to MFP 1010. The jobs may be sent to MFP 1010 directly from other devices, or indirectly via cloud system 1000. MFP 1010 may send digital data directly to other devices or store the digital data on cloud system 1000.

Figure 5:
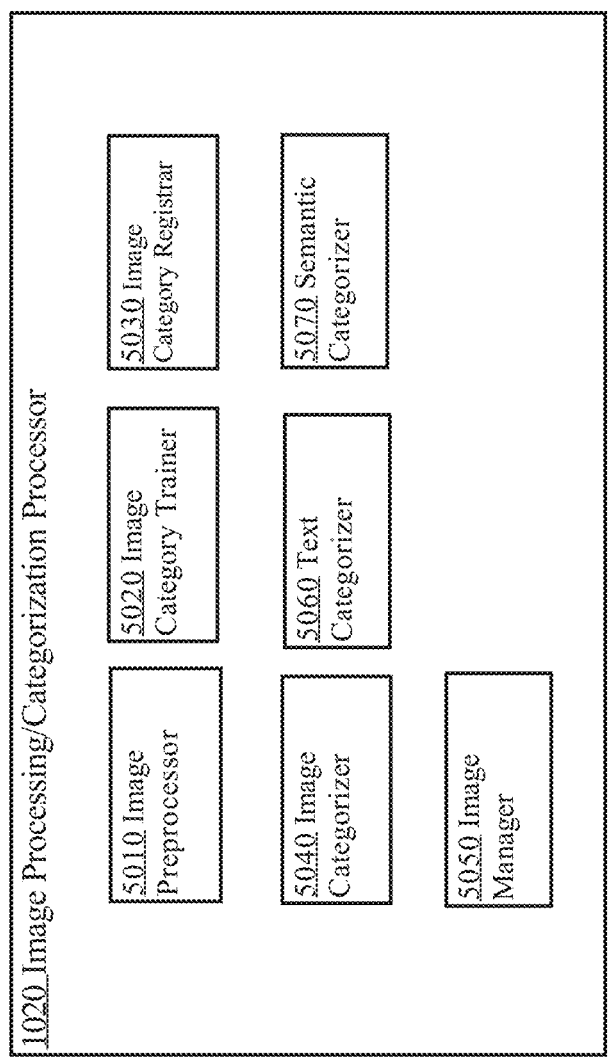
FIG. 5 is a block diagram that depicts an example of an image processing/categorization processor.

IPC processor 1020 may be configured to process received digital data and determine whether the received digital data may be categorized into one or more categories. IPC processor 1020 may receive digital data directly from other devices, or may retrieve digital data from cloud system 1000. IPC processor 1020 may associate categories to the received digital data, and store the respective associations either in a local storage device or on cloud system 1000. An example of IPC processor 1020 is depicted in FIG. 5.

Application servers 1030, 1100 may be configured to host and provide execution environment for software applications configured to process information and to store the processed information in a local storage device or on cloud system 1000. For example, application server 1030 may be configured to host a software application designed to process electronic invoices, update an invoice database stored on cloud system 1000, and generate invoice reports based on the data stored in the invoice database. According to another example, application server 1100 may be configured to process electronic filing receipts received from the United States Patent and Trademark Office (USPTO) website upon submitting an electronic document to the USPTO. Application server 1110 may docket the received electronic filing receipt, and update a docketing database stored on cloud system 1000.

Digital data server 1040 may be configured to receive electronic data from other devices, send the electronic data to other devices, and store the electronic data in a storage device or on cloud system 1000. For example, digital data server 1040 may communicate with other servers, and receive from other servers electronic update data, such as stock market data, invoice data, or other electronic data. Digital data server 1040 may also store the received data on cloud system 1000 or send the received data to other devices.

Workstation 1090 may be configured to provide an execution environment to software applications configured to process received digital data. For example, workstation 1090 may be configured to support execution of an email application, which may handle receiving emails, generating emails, sending emails and otherwise processing emails. According to another example, workstation 1090 may be configured to support execution of an invoice generating application, which may facilitate generating electronic invoice data, sending the invoice data to other devices, receiving electronic invoice data, updating an invoice database, and storing electronic invoice data in a local storage device or on cloud system 1000. Workstation 1090 may be used to execute an image category trainer 5020, depicted in FIG. 5.

Mobile device 1080 may be configured to receive, process and transmit electronic data. For example, mobile device 1080 may be configured to receive and place telephone calls, access the Internet, generate and receive electronic data, take pictures of physical objects, display digital image data, record and play video data, and otherwise process electronic data.

Digital data supply processor 1070 may be configured to supply digital data to processing environment 100. Digital data supply processor 1070 may also be configured to generate additional data for the received digital data. For example, digital data supply processor 1070 may extract the digital data from a database and port the extracted data to an application. In case of an invoice processing, upon receiving an invoice, digital data supply processor 1070 may access a purchase order database to obtain a purchase order related to the invoice, and associate the obtained purchase order with the invoice.

OCR processor 1050 may be configured to perform optical character recognition of digital data. For example, OCR processor 1050 may use image data as input, and use the image data to generate a sequence of words or phrases as output.

Devices included in processing environment 100 may communicate with each other via any number and type of communications links. Examples of communications links include, without limitation, direct links, local area networks, wide area networks, wired networks, wireless networks, packet-switched networks such as the Internet, etc. As depicted in FIG. 1A, devices of processing environment 100 communicate with each other via a network, such as a cloud system 1000. For example, an application executed on workstation 1090 may be configured to create a print job for printing a document on MFP 1010 and store the print job in cloud system 1000, so that MFP 1010 may retrieve the print job from cloud system 1000 and print the document. According to another example, MFP 1010 may scan a document, generate electronic data for the document, and store the electronic data in cloud system 1000, so that OCR processor 1050 may retrieve the electronic data for the document from cloud system 1000, perform OCR of the electronic data, create electronic data in a standard text format, and store the electronic data in the standard text format in cloud system 1000.

Some devices included in processing environment 100 may communicate with each other directly. For example, an application executed on workstation 1090 may create a print job for printing a document on MFP 1010, and, although it is not depicted in FIG. 1A, send the print job directly to MFP 1010, bypassing cloud system 1000. According to another example, MFP 1010 may scan a document, generate electronic data for the document, and send the electronic data to OCR processor 1050, so that OCR processor 1050 may perform OCR of the electronic data, create a document for the electronic data, and store the document in a storage associated with OCR processor 1050.

III. Subscription Assignments

Knowledge database 1210 may be used to store various types of information. For example, knowledge database 1210 may store information about entities, services that the entities may request, service providers from whom the entities may request the services. Knowledge database 1210 may also store information about history logs of various services provided to various entities by various service providers in the past. The information about the entities, the service providers and their contractual obligations to provide the services to the entities may be obtained from contracts or other agreements binding the entities and the service providers. The term contract and the term agreement are used herein interchangeably.

Knowledge database 1210 may be trained using information about contractual obligations between entities and service providers. The training may take place when the information about the contracts becomes available. The information stored in knowledge database 1210 may be updated as the contracts are modified and cancelled.

In an embodiment, knowledge database 1210 includes information about contractual obligations between entities and service providers with respect to the entities' subscriptions to services offered by the service providers. The contracts herein may be also referred to as subscription assignments. For example, a subscription assignment may specify that a particular entity has subscribed to a particular service provided by a particular service provider. Information about the subscription assignment may be stored in knowledge database 1210 when either knowledge database 1210 is trained or deployed, or the subscription assignment becomes available.

FIG. 1B is a block diagram that depicts examples of subscription assignments. The examples include a contract 122, a contract 124 and a contract 126. These examples are provided merely to illustrate one of many ways of graphically representing examples of subscription assignments.

In the example depicted in FIG. 1B, contract 122 specifies a name of the contract 122a, one or more parties 122b to the contract 122, and one or more subscription agreements pertaining to one or more services 122d that one of the parties is obligated to provide to another party. In this example, Contract 122 binds a service provider, who is Party 1, and an entity 1, who is Party 2. According to the subscription agreement 122b, Party 2 subscribes to services 122d provided by Party 1. Services 122d include Service A and Service B. In this example, any user who is authorized to use access credentials of entity 1, may request and receive service A and/or Service B from the service provider.

Other examples of subscription assignments may include agreements between more than two parties, agreements for a plurality of subscriptions, and agreements for a plurality of services. For example, contract 124 specifies that a service provider is contractually obligated to provide services A and B to an entity 2, and only service A to a user 1. In this example, user 1 may be an employee of entity 2, and user 1 may request only service A from the service provider, while a manager or a chief officer who represents entity 2 may request both services A and B from the service provider.

According to other example, contract 126 specifies that a service provider is contractually obligated to provide a service A and a service B to an entity K, and only service A to users 1-4. If users 1-4 are employees responsible for providing billing data, then users 1-4 may request service A from Party 1. However, a billing department manager who represents the entire billing department may request and receive both services A and B from the service provider.

Other representations of subscription assignments may also be used to illustrate how information about the subscription assignments is parsed, interpreted and stored in knowledge database 1210.

IV. Relations Between Service Providers and Entities

Subscription agreements may be used to determine contractual relationships between service providers and entities. Contractual relationships may be represented in a variety of ways, including various graphical representations. For example, the contractual relationships may be represented as a graph in which service nodes represent services, entity nodes represent entities, and connections between the service nodes and the entity nodes represent contractual relationships between the services provided by the service providers to the entities. According to another example, contractual relationships may be represented as a graph in which service provider nodes represent service providers, entity nodes represent entities, and connections between the service provider nodes and the entity nodes represent contractual relationships between the service providers and the entities. An example, of such a graph is depicted in FIG. 1C.

Figure 1C:
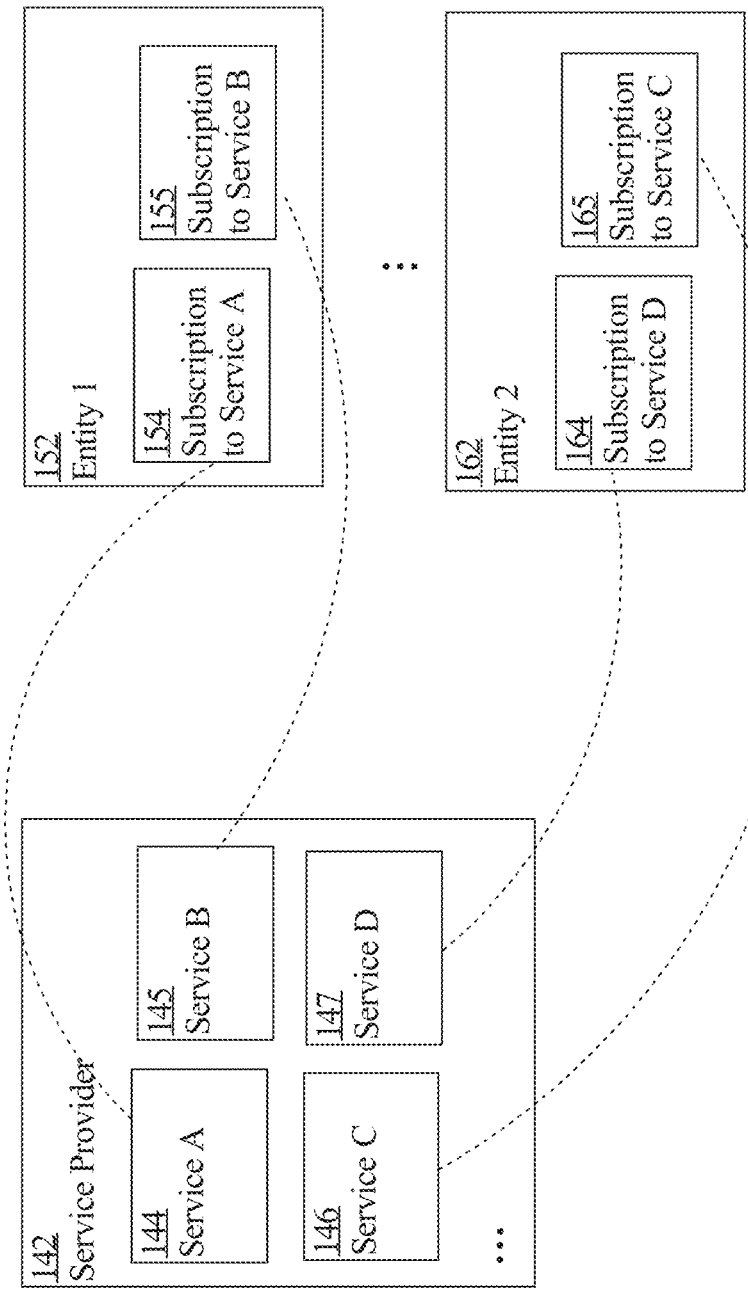
FIG. 1C is a block diagram that depicts examples of relations between service providers and entities.

FIG. 1C is a block diagram that depicts examples of relations between service providers and entities. In the depicted example, a service provider 142 offers a service A 144, a service B 145, a service C 146, a service D 147, and possibly some other services. Entities that subscribe to one or more services offered by service provider 142 include an entity 152, an entity 162, and possibly some other entities. Entity 152 has two subscriptions that include a subscription 154 and a subscription 155. Subscription 154 specifies that entity 152 is entitled to service 144. Subscription 155 specifies that entity 152 is entitled to service 145. Entity 162 has two subscriptions that include a subscription 164 and a subscription 165. Subscription 164 specifies that entity 162 is entitled to service 147. Subscription 165 specifies that entity 162 is entitled to service 146.

The contractual relationships between entities and service providers may also be represented using other types of graphs and depictions.

V. Associations Between Entities and Users

An entity may be interpreted either as logical entity, such as a company, an organization, a university, a group of users, and the like, or as a physical entity, such as a user, a customer, a subscriber, and the like. If an entity corresponds to a logical entity, then the entity may be provided access credentials associated with the logical entity. For example, if an entity corresponds to Acme Corporation, then the entity may be provided one or more sets of access credentials that have been created for Acme Corp. Such access credentials may be used by for example, directors and/or managers of Acme Corp. For instance, the credentials may be used and/or shared by individuals such as a chief executive officer, a company president, a chief financial officer, and the like. Furthermore, each of the executives of Acme Corp. may have his/her own access credentials, and/or all executives of Acme Corp. may share one set of access credentials.

If an entity corresponds to a physical entity, then the entity may be provided a set of access credentials that has been created for the physical entity. Such credentials may be used by an individual user, an individual customer, or an individual subscriber.

Entities and users may be related to each other. For example, an entity may correspond to a logical entity, such as a company or an organization, and may be associated with one or more users. In such an organization, an entity may be provided one or more set of access credentials, while each of the users associated with the entity may be provided a separate set of access credentials, or one set of the access credentials provided to the entity. Alternatively, an administrator of the entity may assign an access credential to a user of the entity. For example, if an entity corresponds to Acme Corp., and the entity has two associated users, then executives of Acme Corp. may be provided one or more sets of entity access credentials, while each of the two associated users may be provided a separate set of user access credentials. The access credentials may be used to access data processing environment 100, and may be used to browse knowledge database 1210 to search history logs stored in knowledge database 1210 for the entities and for the users.

Figure 1D:
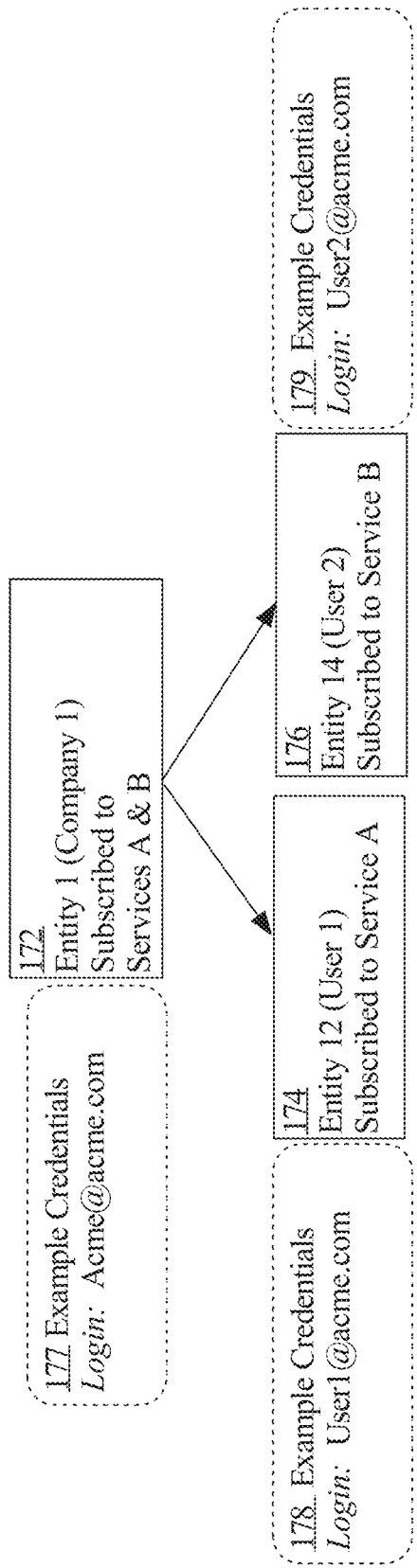
FIG. 1D is a block diagram that depicts examples of associations between entities and users.

FIG. 1D is a block diagram that depicts examples of associations between entities and users. In the depicted example, an entity 172 is Acme Corp. Entity 172 subscribed to two services, a service A and a service B, each provided by either different service providers or the same service provider. Entity 172 was provided with one set of access credentials 177, which can be used by one or more executives of Acme Corp. In this example, entity 172 was provided with Acme@acme.com credentials. These credentials may be used by the executives of Acme Corp. to access data processing environment 100, and may be used to search historical data associated with entity 172 and stored in knowledge database 1210.

In the example depicted in FIG. 1D, entity 172 has two associated users, including a user 1 and a user 2. The user 1 subscribed to a service A, while the user 2 subscribed to a service B. The user 1 was provided with individual access credentials User1@acme.com 178, while the user 2 was provided with individual access credentials User2@acme.com 179. Therefore, if the user 1 provides his access credentials 178, his access credentials 178 will be used to authenticate the user 1 to data processing environment 100, determine history data stored for the user 1 in knowledge database 1210, determine a particular service, or services, that the user 1 may be authorized to use, and transmit electronic data received from the user 1 to a service provider that provides the particular service.

Similarly, if the user 2 provides his access credentials 179, access credentials 179 will be used to authenticate the user 2 to data processing environment 100, determine history data stored for the user 2 in knowledge database 1210, determine a particular service, or services, that the user 2 may be authorized to use, and transmit electronic data received from the user 2 to a service provider that provides the particular service.

VI. Knowledge Database

Knowledge database 1210 may store information about contracts binding various entities with various service providers. Knowledge database 1210 may also store information specifying subscriptions between the entities and the service providers, and history logs of requests submitted by the entities to the service providers in the past. The stored information may be used to determine classifications of categories, such as service categories, template categories, and the like.

In an embodiment, knowledge database 1210 may store historical data collected for individuals and companies in one or more compact forms. Examples of compact forms may include compressed data representations, such as zipped files, incrementally archived data, and the like. Storing information in knowledge database 1210 in a compact form may enable an efficient data mining, and data categorization.

Information stored in knowledge database 1210 may be organized in a variety of ways. An organization of the information depends on the type of information that is stored and the contents of the information, including the relationships between entities, service providers and services. For example, the information may be stored using a hierarchical structure, such as a tree graph structure, which includes entity nodes, service nodes, service provider nodes, category nodes, sub-category nodes, and so forth. An example of one of many organizations of the information stored in knowledge database 1210 is described in FIG. 1E.

In an embodiment, a category data object is maintained for each of one or more categories. A category data object may comprise a main category identifier, one or more levels of one or more sub-categories, one or more image characteristics, one or more word characteristics, one or more semantics characteristics, and one or more references to one or more applications.

A new category may be added to the existing categories by defining a new category data object. A new category data object may comprise a new main category identifier, one or more levels of one or more new sub-categories, one or more new image characteristics, one or more new word characteristics, one or more new semantics characteristics, and one or more new references to the one or more applications.

Figure 1E:
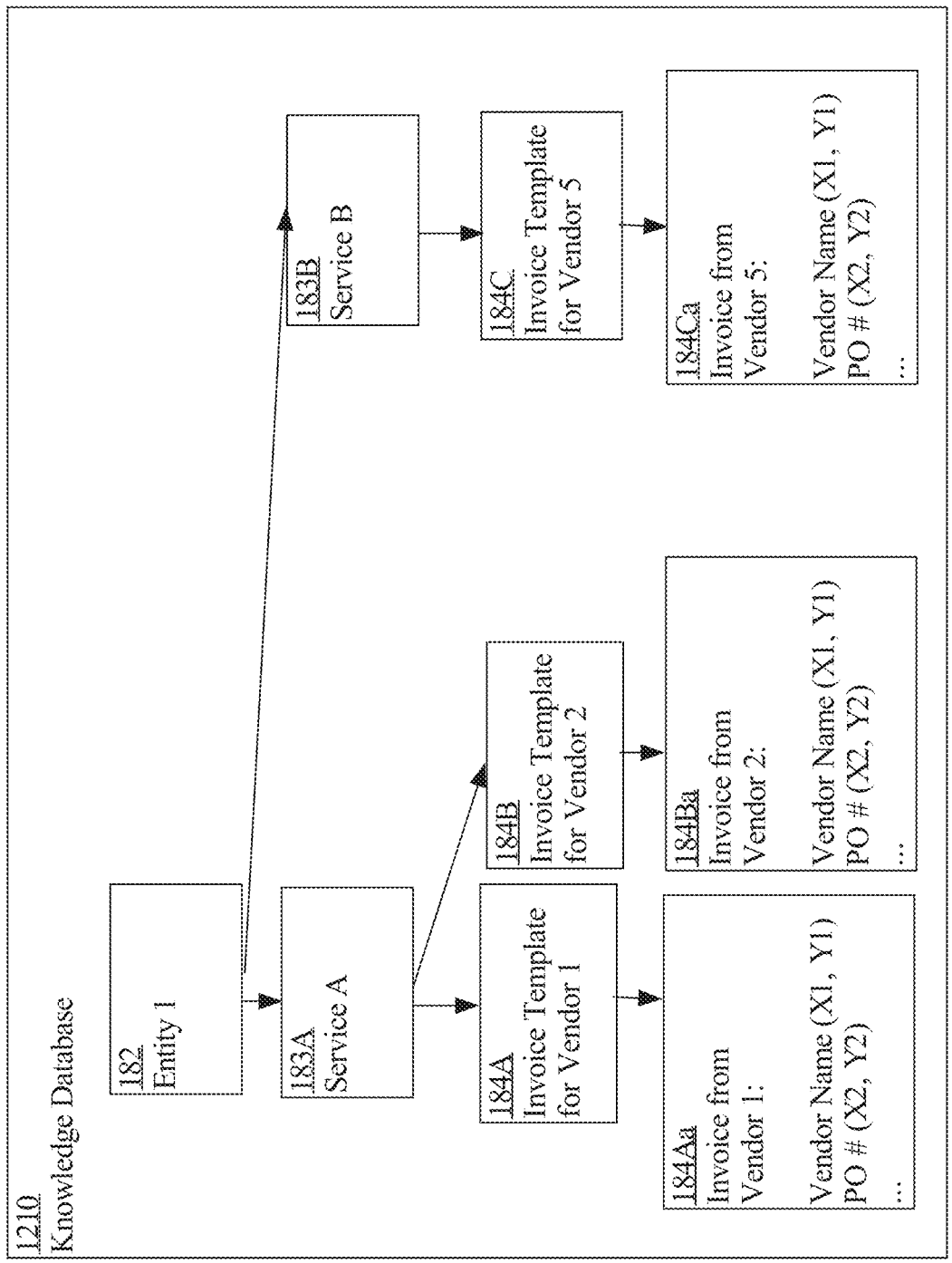
FIG. 1E is a block diagram that depicts an example organization of an example knowledge database.

FIG. 1E is a block diagram that depicts an example organization of an example knowledge database 1210. In the depicted example, knowledge database 1210 comprises one or more entity nodes 182. An entity node 182 corresponds to either a logical entity, such as a company, an organization, a group of users, and the like, or a physical entity, such as a user, a customer, or a subscriber.

Knowledge database 1210 may also include one or more service nodes 183A, 183B, each corresponding to a service to which entity 182 subscribed according to a subscription agreement. In the depicted example, entity 182 subscribed to two services A and B, represented in FIG. 1E by service nodes 183A and 183B. In an embodiment, service nodes 183 correspond to categories. For example, entity 181 may subscribe to service 183A, which may correspond to a QuickBooks invoice processing, and to service 183B, which may correspond to TyMetrix invoice processing.

Each service 183 may have associated one or more sub-categories. The sub-categories may correspond to forms or templates that may be used to facilitate processing electronic data according to a corresponding service. In the example depicted in FIG. 1E, service 183A has two associated sub-categories, which are an invoice template 184A for a vendor 1, and an invoice template 184B for a vendor 2. In this example, service 183A may be performed by the vendor 1 if electronic data received from entity 182 can be presented using invoice template 184A, or may be performed by the vendor 2 if the electronic data received from entity 182 can be presented using invoice template 184B.

Each sub-category 184 may have associated one or more sub-sub-categories. The sub-sub-categories may correspond to one or more characteristics of a sub-category 184. In the example depicted in FIB. 1E, invoice template 184A has a sub-sub-category 184Aa, and invoice template 184B has a sub-sub-category 184Ab. In this example, service 183 may be performed by the vendor 1 if electronic data received from entity 182 can be presented using invoice template 184A because it has characteristics defined using sub-sub-category 184Aa, or may be performed by the vendor 2 if the electronic data received from entity 182 can be presented using invoice template 184B because it has characteristics defined using sub-sub-category 184Ba.

Continuing with the example depicted in FIG. 1E, service 183B has one associated sub-category, which is an invoice template 184C for a vendor 5. In this example, service 183B may be performed by the vendor 5 if electronic data received from entity 182 can be presented using invoice template 184C.

Furthermore, invoice template 184C has a sub-sub-category 184Ca. In this example, service 183B may be performed by the vendor 5 if electronic data received from entity 182 can be presented using invoice template 184C because it has characteristics defined using sub-sub-category 184Ca.

Other organizations of knowledge database 1210 may also be implemented. For example, knowledge database 1210 may also include information about frequencies of services ordered or performed in the past. For example, knowledge database 1210 may include information about services, the services' categories, the services' sub-categories, and the services' sub-sub-categories for the processing performed for entities in the past. Knowledge database 1210 may also include information about the services used by each of the entities the most frequently and/or the least frequently. Knowledge database 1210 may also include information about service providers that are used by the entities the most frequently and/or the least frequently.

In an embodiment, knowledge database 1210 stores information that can be shared between a pluralities of entities and vendors. For example, knowledge database 1210 may store the invoice information indicating locations for certain text fields, such as a location of a purchase order text field, a location of a vendor name text field, and the like, for not just one specific individual invoice form, but for a plurality of forms for various vendors. In this case, the invoice information for invoices for vendor 1, vendor 2, vendor 3, and so on, may be shared among different entities and users. This allows limiting the amount of special training of the system because the training may be performed via processing of the service that may be provided not by one individual vendor, but by several vendors.

VII. Credentials Processing

Access to a data processing system may be granted to an entity if the entity provides valid access credentials. If the entity provides valid access credentials, then the entity may also provide electronic data to the data processing system. The electronic data may be represented as image data or as digital data. Image data may correspond to a scanned image of an invoice, a scanned image of a bill, and the like. The image data may be represented in any of known image data files, such as .jpg, .tiff, .pdf, and the like. In contrast, digital data may correspond to alphanumerical representation of an invoice, a bill, and the like. The digital data may be represented in any of known digital data formats, such as .doc, .docx, .pdf and the like.

Figure 2A:
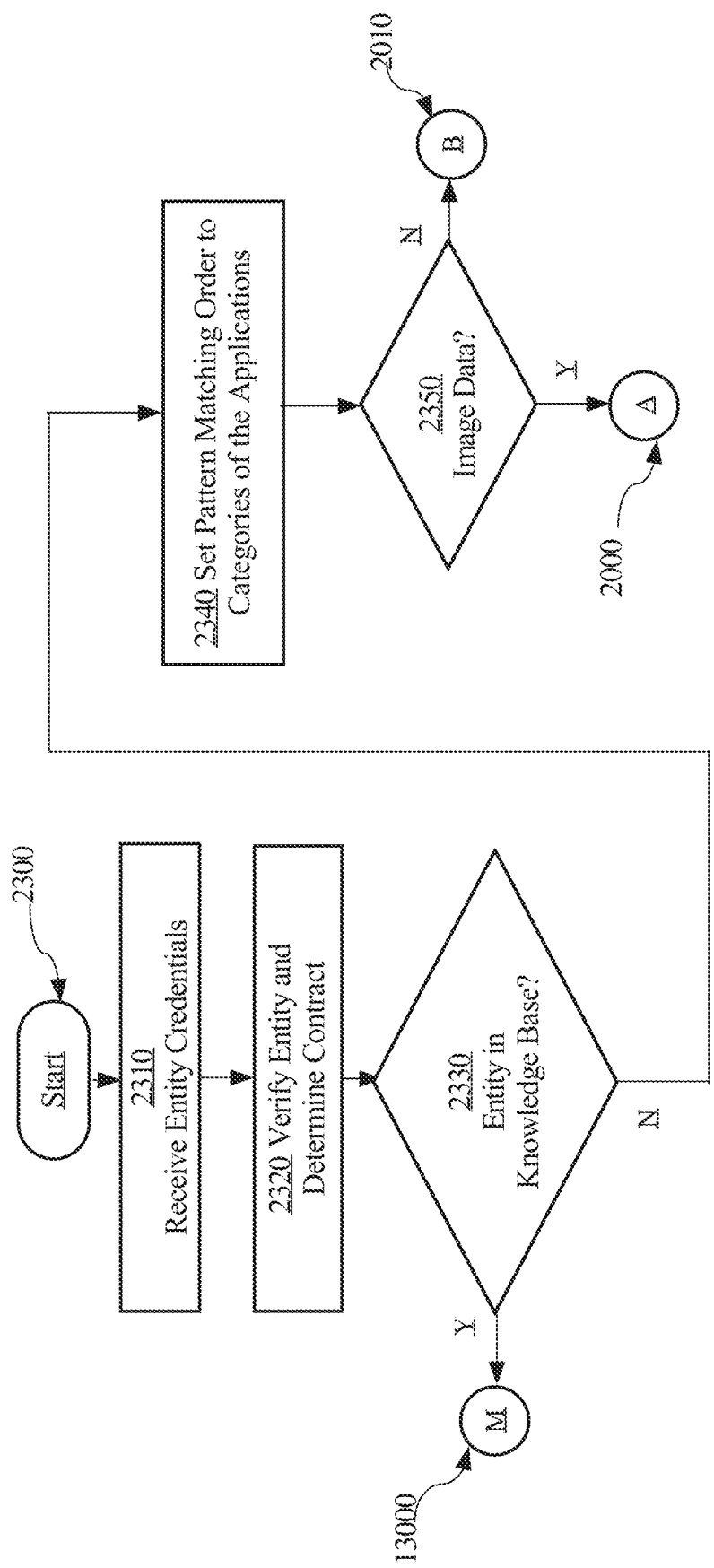
FIG. 2A is a flow diagram that depicts an example of processing access credentials.

FIG. 2A is a flow diagram that depicts an example of processing access credentials. In step 2300, a data processing system generates a GUI and displays the GUI on a user computer. Using the GUI, a user may enter access credentials, such as an email address, an identification. Alternatively, a user may provide his/her identification via a sensor device, such as a retina sensor, a quick response (QR) reader, a thumb code reader, an ID card and the like.

In step 2310, access credentials are received from an entity by a data processing system. The received access credentials may be parsed, analyzed and other processed before they are sent for authentication and/or authorization.

In an embodiment, based on access credentials received from an entity, it is determined whether the entity is authorized to request a service from a service provider. Depending on the outcome of the authorization, an appropriate message is generated and displayed on a user display screen to indicate whether the entity is authorized to request a service from a service provider. The authorization may be performed based on email address provided by the entity, a login credentials, a thump imprint, a QR code, and the like.

In set 2320, access credentials of an entity are used to verify whether the entity is authorized to use resources of a data processing system. For example, if the access credentials include an email address of a user, then the data processing system may check whether the provided email address has been registered with the data processing system.

If access credentials received from an entity are positively verified, then step 2330 is performed. Otherwise, a message may be displayed on a user computer to indicate that the provided access credentials are invalid, or that the provided access credentials do not identify any subscriber in the data processing system.

In step 2330, access credentials provided by an entity are used to determine whether knowledge database 1210 contains any information about the entity. For example, the access credentials may be used to determine whether any contract information may be identified in knowledge database 1210 based on the access credentials. The access credentials may also be used to determine whether knowledge database 1210 contains any information associated with the provided email address. The associated information may include information about the services that the entity received in the past, information about the services providers that provided services to the entity in the past, information about contractual obligations binding the entity and other parties, and the like.

If it is determined that knowledge database 1210 contains information about an entity, such as information about contracts binding the entity with one or more service providers for providing one or more services, then step 13000 is performed. That step is described in detail in FIG. 2B. However, if knowledge database 1210 does not contain contract information for the entity, then step 2340 is performed.

In step 2340, it is determined that knowledge database 1210 does not contain any contract information binding an entity with one or more service providers for providing one or more services. In this step, a pattern matching order is set to categories to determine one or more services that may be suitable for processing electronic data provided by the entity. A pattern matching order is a pattern indicating to a data processing system the manner in which knowledge database 1210 may be searched to determine one or more services, corresponding to one or more categories, respectively, that may be suitable to process the electronic data provided by the entity.

A match is found if, for example, characteristics of electronic data received from an entity and characteristics of a particular service (category) match at some confidence level. The confidence level may be determined based on a confidence level measure, which may be obtained by comparing numerical values representing the characteristics of the electronic data with numerical values representing the characteristics of the particular services. The resulting comparison value may be interpreted as a confidence level value. For example, if the confidence level value, computed for the characteristics of electronic data received from the entity and the characteristics of the particular services, exceeds a certain threshold value, then the match between the characteristics of the electronic data and the characteristics of the particular service is found.

In step 2350, it is determined whether electronic data provided by an entity is image data. If the electronic data provided by the entity is image data, then step 2000 is performed. In that step, the data is converted, if needed, to a standard image format or processed using optical character recognition (OCR) utility, and the resulting image data is parsed to determine one or more categories. Step 2000 is described in detail in FIG. 2C.

However, if in step 2350, it is determined that electronic data provided by an entity is not image data, then step 2010 is performed. In this step, it is assumed that the electronic data provided by the entity is digital data that can parsed. In the processing of parsing of the electronic data, it is determined whether the electronic data contains any hint of one or more categories, corresponding to for example, services. Step 2010 is described in detail in FIG. 2C.

VIII. Determining Categories for Received Electronic Data

Upon receiving access credentials from an entity, and upon a successful authorization of the entity to a data processing system, the access credentials are used to determine whether any information about the entity is stored in knowledge database 1210. For example, a determination may be made that knowledge database 1210 contains one or more history logs stored in knowledge database 1210 for the entity, and that the history logs include information about the services that the entity used in the past, and/or the service providers that provided the services to the entity. Knowledge database 1210 may also include information about contracts binding the entity with one or more service providers that are obligated to provide one or more services to the entity. If any of such information is found in knowledge database 1210 for the entity, then such information may be used to determine one or more services, also referred to as categories, which may be performed for the entity with respect to the electronic data provided by the entity to the data processing system.

Figure 2B:
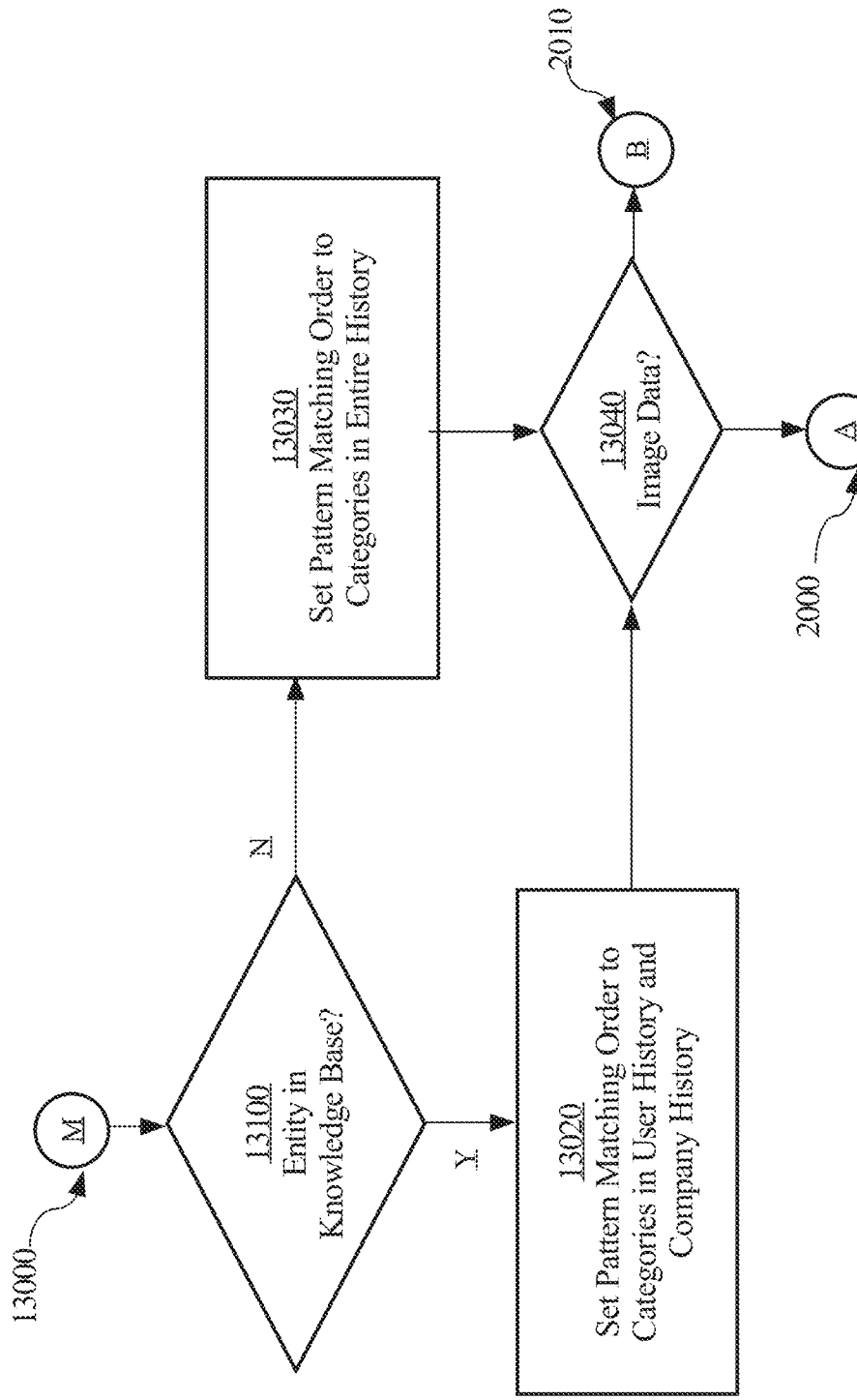
FIG. 2B is a flow diagram that depicts an example of determining categories for received electronic data.

FIG. 2B is a flow diagram that depicts an example of determining categories for received electronic data. Step 13000 leads from FIG. 2A to FIG. 2B. At this point, access credentials from an entity have been received. The access credentials may include a user identification, a password, a scan of a person's thumb, a scan of a person's eye, and the like. Electronic data is also received from the entity. Non-limiting examples of the electronic data include electronic data of a fax communication, electronic data of an email, electronic data of an invoice, and electronic data of a wire communication.

In step 13010, access credentials received from an entity are used to determine whether knowledge database 1210 contains information about the entity. The information may include history logs that include information about the services that the entity used in the past, the service providers that provided services to the entity in the past, the contracts binding the entity to the service providers, and the like.

A. Information about an Entity Present in a Knowledge Database

In response to determining that knowledge database 1210 contains information about the entity, step 13020 is performed. Otherwise, step 13030 is performed.

In step 13020, a pattern matching order is set to categories for searching user history logs associated with an entity. The history logs associated with the entity may include various logs, such as history logs associated with a company corresponding to the entity, history logs associated with users working for the company and authorized to use a data processing system, and the like. In this step, the history logs stored in knowledge database 1210, including company history logs and user history logs, are identified and selected to be subjected for a search for determining one or more services, also referred to as categories, which may be suitable for processing electronic data provided by the entity.

In step 13040, it is determined whether electronic data provided by an entity is image data. If the electronic data provided by the entity is image data, then step 2000 is performed. In that step, the data is converted, if needed, to a standard image format or processed using optical character recognition (OCR) utility, and the resulting image data is parsed to determine one or more categories. Step 2000 is described in detail in FIG. 2C.

However, if in step 13040, it is determined that electronic data provided by an entity is not image data, then step 2010 is performed. In this step, it is assumed that the electronic data provided by the entity is digital data that can parsed. In the processing of parsing of the electronic data, it is determined whether the electronic data contains any hint of one or more categories, corresponding to for example, services. Step 2010 is described in detail in FIG. 2C.

Figure 2C:
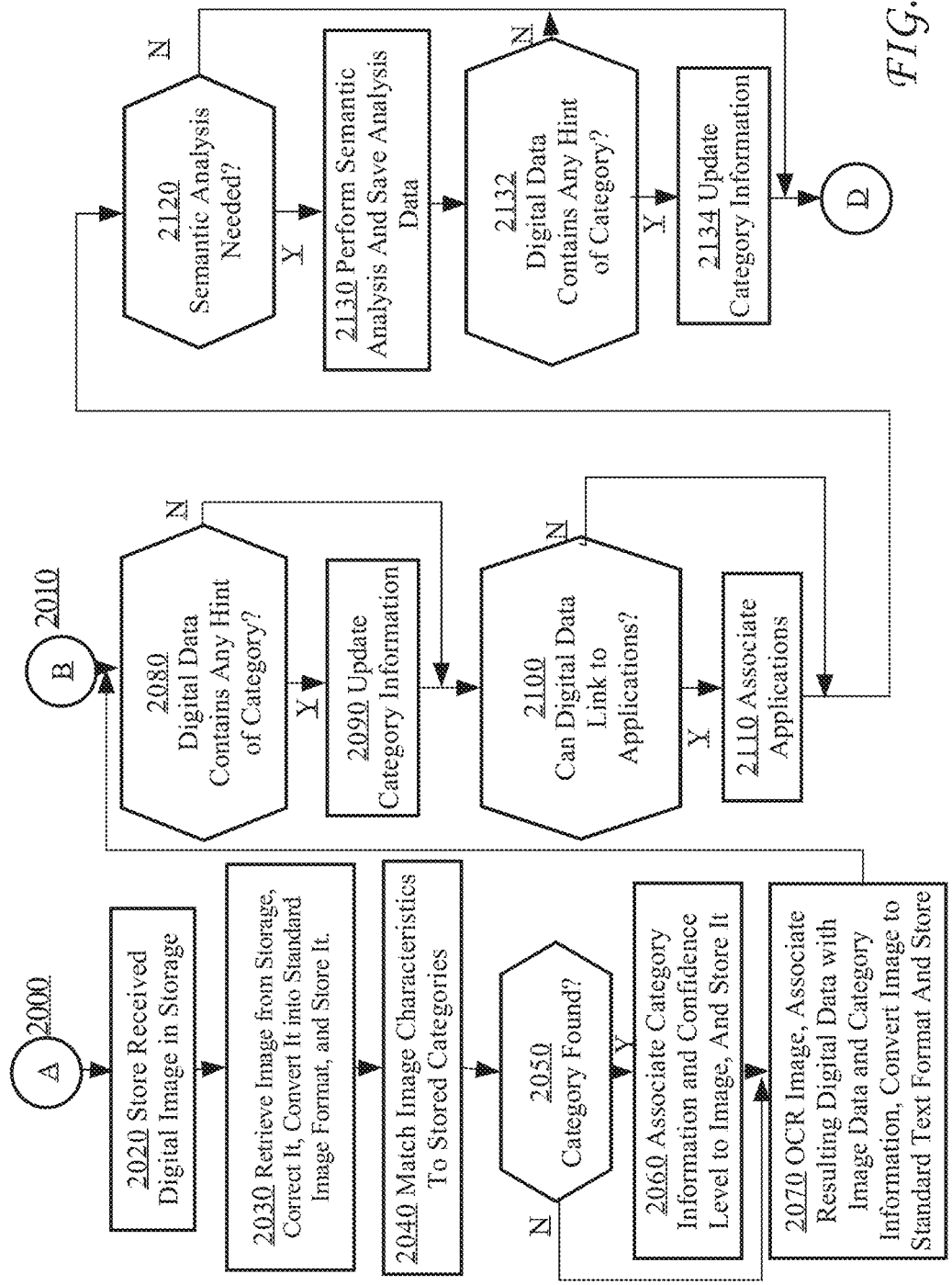
FIG. 2C is a flow diagram that depicts an example of processing data received from various data sources.

The processing described in detail in FIG. 2C, may lead to identifying one or more categories (services) that may be provided to an entity with respect to electronic data provided by the entity. For example, based on information stored in knowledge database 1210 stored for a first entity, first information may be determined. The first information may be used to determine a first service and a first service category, of one or more categories, of the first service provided by a first service provider to the first entity in the past. For example, the first information may be used to identify a contract that specifies the first entity and the first service provider as parties to the contract, and that specifies that the first service provider is obligated to provide first service to the first entity. Examples of the services may include account payable for invoices to a QuickBooks processing, a TyMetric processing, an invoice processing, an email storing, archiving and managing, a productivity report managing, and the like.

The first service category may also be used to determine one or more first sub-categories associated with the first service. For example, if a first service is account payable for invoices to a QuickBooks processing, then one or more sub-categories may include one or more templates of the forms that are provided as invoices from different vendors.

Each of the one or more first sub-categories may have one or more first sub-category characteristics. The sub-category characteristics may also be referred to as sub-sub-categories.

Continuing with the previous example, if a first sub-category is a Vendor A template form, then the characteristics may specify the location on the template form of the identification data of a customer, the location on the template form of the subtotal information, the location on the template form of the total information, and the like.

Determining whether electronic data received from an entity may be processed using a particular service may include a comparison between characteristics of the electronic data with characteristics of the services that the entity used in the past. For example, one or more electronic data characteristics of the electronic data received from the first entity may be determined. A particular electronic characteristic of the electronic data may specify the location on the form represented by the electronic data of the identification data of a customer.

The one or more electronic data characteristics may be used to determine whether any of the one or more electronic data characteristics of the electronic data matches one or more sub-category characteristics of any of the one or more sub-categories associated with the service. For example, if the electronic document is an invoice form, and has a particular characteristic that specifies the location on the form the location of the identification data, then the particular characteristic of the electronic data may be used to determine whether there is a match between that particular characteristic and any service characteristic of the service that the entity received from the service provider in the past.

A match is found if, for example, characteristics of electronic data received from an entity and characteristics of a particular service (category) match at some confidence level. The confidence level may be determined based on a confidence level measure, which may be obtained by comparing numerical values representing the characteristics of the electronic data with numerical values representing the characteristics of the particular services. The resulting comparison value may be interpreted as a confidence level value. For example, if the confidence level value, computed for the characteristics of electronic data received from the entity and the characteristics of the particular services, exceeds a certain threshold value, then the match between the characteristics of the electronic data and the characteristics of the particular service is found.

Continuing with the previous example, if a match between electronic data characteristics of the electronic data received from an entity and characteristics of the sub-categories (such as characteristics of a particular template used by a particular service) of the services provided to the entity in the past is found, then the electronic data received from the entity is used to modify the particular template. For example, in response to determining that a first electronic data characteristic, of the one or more electronic data characteristics of the electronic data, matches a first sub-category characteristic, of the one or more first sub-category characteristics of a first sub-category of the one or more first sub-categories associated with the first service, the electronic data is used to generate an updated first sub-category for the first sub-category associated with the first service.

This may be illustrated using the following example: upon determining that a first electronic data characteristic, of the one or more electronic data characteristics of the electronic data, matches a first sub-category characteristic of a first template of a first service provided to the entity in the past, an updated first sub-category for an invoice form may be generated. The updated invoice form may be generated, which corresponds to the first sub-category, and using the contents of the electronic data, which contains actual information about the customer, the subtotals, the totals, and the like.

An updated sub-category may be stored in knowledge database 1210. The manner in which the updated sub-category is stored in knowledge database 1210 depends on the organization of knowledge database 1210 and structural dependency implemented in knowledge database 1210. Non-limiting examples of storing the updated sub-category may include storing the sub-category in association with the identified service, storing the sub-category in association with the entity that requested the processing, storing the sub-category in association with the service and the entity, and the like.

Contents of an updated sub-category may be further processed and/or transmitted to a service provider for processing. For example, if the updated sub-category includes an actual invoice form containing the actual information about the customer, the subtotals, and the totals, then the updated invoice form may by transmitted to the first service provider for processing using the QuickBooks application.

At this point, the processing of electronic data received from an entity when knowledge database 1210 contains information about the entity may end. Additional processing may include sending messages to the entity and/or to the service provider to indicate the processing progress or the processing failures.

The processing of electronic data received from an entity when knowledge database 1210 does not contain information about the entity is described below.

B. Information about an Entity not Present in a Knowledge Database

Referring again to FIG. 2B, if in step 13100, it is determined that knowledge database 1210 does not contain information for an entity, then step 13030 is performed. For example, if the entity did not receive any service in the past, or the entity has not entered into any contracts with service providers, then knowledge database 1210 may contain no history logs for the entity. In such a situation, knowledge database 1210 may be queried to determine whether knowledge database 1210 includes any information of some services that have characteristics matching the characteristics of electronic data received from the entity. This is described in steps 13030, 13040 and FIG. 2C.

In step 13030, a pattern matching order is set to categories for searching entire history data stored in knowledge database 1210. The history data may include the history logs associated with various entities, history logs associated with various users, history logs associated with various service providers, and the like. In this step, the history logs are identified and selected to be subjected for a search for determining one or more services, also referred to as categories, which may be suitable for processing electronic data provided by the entity.

In step 13040, it is determined whether electronic data provided by an entity is image data. If the electronic data provided by the entity is image data, then step 2000 is performed. In that step, the data is converted, if needed, to a standard image format or processed using optical character recognition (OCR) utility, and the resulting image data is parsed to determine one or more categories. Step 2000 is described in detail in FIG. 2C.

However, if in step 13040, it is determined that electronic data provided by an entity is not image data, then step 2010 is performed. In this step, it is assumed that the electronic data provided by the entity is digital data that can parsed. In the processing of parsing of the electronic data, it is determined whether the electronic data contains any hint of one or more categories, corresponding to for example, services. Step 2010 is described in detail in FIG. 2C.

If knowledge database 1210 does not contain any information about services that were provided to an entity in the past, then a data processing system may try to find out one or more services that were provided to other entities and that may have characteristics that match characteristics of electronic data received from the entity. For example, in response to determining that knowledge database 1210 does not contain any information about the entity, a service provided by a service provider to another entity may be identified in knowledge database 1210. For that service, a service category and one or more sub-categories associated with the service may be identified. Subsequently, it is determined whether any of the one or more electronic data characteristics of the electronic data matches one or more sub-category characteristics of any of the one or more sub-categories associated with the service. The various ways of determining a match are described above. In response to determining that an electronic data characteristic, of the one or more electronic data characteristics of the electronic data, matches a sub-category characteristic, of the one or more sub-category characteristics of a fourth sub-category of the one or more sub-categories associated with the service, un updated sub-category may be generated. The updated sub-category may be generated based on, at least in part, the electronic data. The updated sub-category may be stored in knowledge database 1210 in association with the service and/or in association with the entity. The updated sub-category may also be stored in association with the service and in association with other entities. Furthermore, the updated contents of the updated sub-category may be transmitted to a service provider that is capable of providing the service to the entity. This approach is based on finding a particular service that was not provided to the entity in the past, but that can be provided to the entity at the present time.

If knowledge database 1210 does not contain any information about services that were provided to an entity in the past, and/or does not contain any information about services that have characteristics matching the characteristics of the electronic data received from the entity, then one or more new data structures may be created and added to knowledge database 1210. The new data structures may correspond to newly created services, newly created service providers, newly created categories, newly created sub-categories. The new data structures may be as templates for processing of the electronic data received from the entity even if the entity has not received any services in the past. This may be performed in response to determining that no service was provided by any service provider to the entity in the past, that the knowledge database does not contain any information about the entity, and that no service was provided by any service provider to any entity in the past that has characteristics that match characteristics of electronic data received from the entity.

In such a situation, electronic data received from an entity is parsed and characteristics of the electronic data are identified. Based on the characteristics, a new service, characteristics of the new services, sub-categories of the new services and sub-sub-categories of the service may be identified. Furthermore, a service provider is identified that is capable of performing the new service. Then, information about the new service, new categories, new sub-sub-categories, the service provider and the like are stored in knowledge database 1210. The information may be stored in knowledge database 1210 in association with the entity. The contents of the sub-categories (or sub-category) may be updated using contents of the electronic data received from the entity. The contents of the updated sub-category may be transmitted to the service provider capable of providing the new service.

At this point, the processing of electronic data received from an entity when knowledge database 1210 does not contain information about the entity may end. Additional processing may include sending messages to the entity and/or to the service provider to indicate the processing progress or the processing failures.

Sections below describe various data analysis techniques for identifying one or more services that are suitable for processing electronic data received from an entity.

IX. Data Formats

Devices included in processing environment 100 may be configured to receive various types of information. The information may be represented in a variety of formats and forms, such as hard copies, electronic data, or alike. A non-limiting example of information represented as a hard copy includes a document printed on a paper medium. Non-limiting examples of such documents include printouts of invoices, printouts of purchase orders, printed reservation confirmations, photographs, photocopies of billing statements, and drawing.

In an embodiment, input data represented as a hard copy is scanned to a scanner and the scanner generates an electronic version of the input data. For example, a document on a paper medium may be fed into MFP 1010, and MFP 1010 may scan the paper document, generate digital image data for the paper document, and store the digital image data in a cloud system 1000 or a storage device.

Conversely, digital image data may be processed to produce a hard copy of the digital image data. For example, a software application executed on workstation 1090 may send digital image data to MFP 1010 and cause MFP 1010 to generate and print out a hard copy of the digital image data.

Generally, digital data may include any of image data, text data, video data, or voice data. Digital data may be represented in a variety of formats. Non-limiting examples of digital image data formats include a PDF, JPEG, GIF, TIFF and alike. For example, digital image data may be the data obtained using a digital camera and stored in a JPEG format.

Non-limiting examples of text data formats include a PDF, MS Word, and alike.

Non-limiting examples of video data formats include MP4, MJ2, and alike.

Non-limiting examples of voice data format include an AIFF, WAV, MP3, and alike.

In an embodiment, data formats that are preferred formats in a particular implementation are referred to as standard formats. The standard formats may include a standard image format, a standard text format and a standard semantic format. A standard image format is an image format that is used by the system for storing, processing and displaying image data. In a particular system, a standard image format may be a TIFF format or a PDF format. Digital data represented in a standard image format is referred to as standard image format data.

A standard text format is a format used by the system to support a word analysis of digital data, and a standard semantic format is a formats used by the system to support a semantic analysis of the digital data. Non-limiting examples of such formats include a CVS, XML, Jason, or other known formats used for expressing text format data and semantic format data. Digital data represented in a standard text format is referred to as standard text format data. Digital data represented in a standard semantic format is referred to as standard semantic format data.

In an embodiment, digital data received from a data source is preprocessed to determine one or more applications that are to be used to further process the digital data. The preprocessing of the digital data may involve examining a format of the digital data, examining a file extension, such as ".doc," ".JPEG," ".TIFF," ".pdf," or ".docx," and determining characteristics of the digital data that may be used to identify one or more categories, and then one or more software applications configured to further process the digital data.

However, in some situations, preprocessing of the digital data may fail to provide sufficient indication of the applications configured to further process the digital data, or the provided indication may be derived with an insufficient level of confidence. In such situations, additional processing of the digital data may be performed.

In an embodiment, additional processing of digital data may include determining word characteristics data or semantics characteristics data for the digital data. For example, the digital data, represented in a PDF format, may be converted to standard text format data, and may be processed by an OCR processor 1050. For instance, OCR processor 1050 may convert the image data into coded data such as Unicode data, and parse the coded data to produce a standard text format data. If during the parsing process a word or a phrase is identified in the standard text format data, then the word or the phrase may be sent to IPC processor 1020, and IPC processor 1020 may use the identified word or phrase to determine one or more categories associated with the word or the phrase.

The standard text format data may also be processed by a semantic analysis processor 1060 to determine semantic characteristics of the standard text format data and generate a standard semantic format data. For example, semantic analysis processor 1060 may use the standard text format data to generate standard semantic format data, determine one or more semantic characteristics of the standard semantic format data, and send the semantic characteristics to IPC processor 1020. IPC processor 1020 may use the semantic characteristics to determine one or more categories associated with the standard semantic format data. Based on the determined categories, one or more applications configured to further process the digital data may be identified.

X. Image Processing/Categorization Processor

FIG. 5 is a block diagram that depicts an example of an IPC processor 1020. In the depicted example, IPC processor 1020 comprises an image preprocessor 5010, an image category trainer 5020, an image category registrar 5030, an image categorizer 5040, a text categorizer 5060, a semantic categorizer 5070, and an image manager 5050. In other implementations, IPC processor 1020 may comprise some of the components 5010-5070, or additional components not depicted in FIG. 5.

Image preprocessor 5010 may be configured to preprocess digital data received from various data sources. Some of the preprocessing may involve reducing noise in the received data, enhancing edges and correcting image skew in the data. Image preprocessor 5010 may store the received data and the preprocessed data in a storage device or in a cloud system 1000.

Image preprocessor 5010 may also be configured to extract image characteristics from received digital data. Furthermore, image preprocessor 5010 may invoke other processors and devices, such as an OCR processor 1050, to convert the received digital data to standard text format data, and if needed, to generate standard semantic format data.

Image category trainer 5020 may be configured to create a set of categories from training data. The training data may emulate the data to be received from various data sources in the future. Image category trainer 5020 may implement a category editor, described in detail in FIG. 6, below.

Image category registrar 5030 may be configured to register a set of categories determined by image category trainer 5020. A registration process may involve determining characteristics of the data for which the categories may be identified, and storing the characteristics, the categories and other information related to the characteristics and the categories.

Image categorizer 5040 may be configured to determine one or more categories for digital data based on image characteristics of the digital data. For example, upon receiving a filing receipt from a particular server, image categorizer 5040 may determine one or more categories for the received filing receipt. The one or more categories may be found using for example, the approach described in FIG. 2, below. If a particular category is found, then image categorizer 5040 may associate the particular category with the received filing receipt. Various methods for assigning categories to received data are described in FIG. 2, below.

Text categorizer 5060 may be configured to determine a category or categories for digital data based upon word characteristics of the digital data. For example, text categorizer 5060 may receive a standard text format data comprising a sequence of character strings (such as words or phrases), and process the received sequence to identify the word characteristics of the strings.

Semantic categorizer 5070 may be configured to determine a category or categories for digital data based upon semantic characteristics of the digital data. For example, semantic categorizer 5070 may receive a standard semantic format data, and process the standard semantic format data to identify the semantic characteristics of the standard semantic format data.

Image manager 5050 may be configured to coordinate information exchange between various objects and components of IPC processor 1020. For example, image manager 5050 may be responsible for retrieving data from various storage locations, transmitting the retrieved data to various components and servers, and storing the received data and preprocessed data in storage devices and cloud systems.

XI. Processing Data Received from Various Data Sources

A. Introduction

Processing data received from various data sources and interfacing the processed data with the applications configured to further process the received data is usually quite challenging. Because the received data may be received from a variety of heterogeneous devices and represented in any of many data formats, determining the applications configured to process the data may be difficult.

Figure 4:
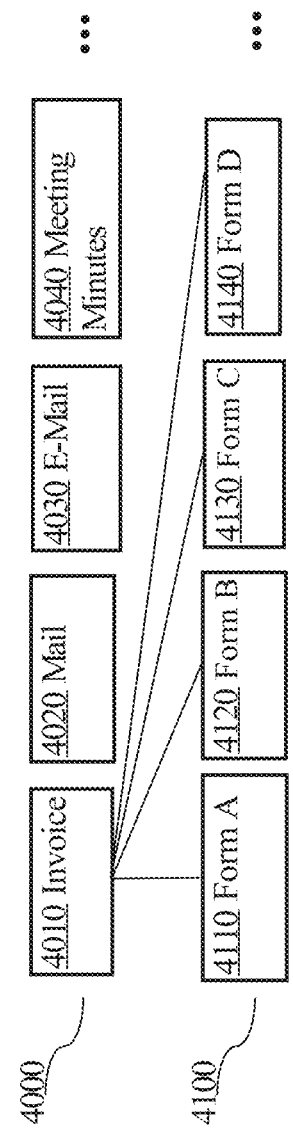
FIG. 4 depicts examples of various types of data received from various data sources.

FIG. 4 depicts examples of various types of data that a data processing system may receive. The example depicts a two-level classification of received data; however, other implementations may have fewer or more classification levels. A first level 4000 comprises a set of various types of received data, including an invoice 4010, mail 4020, electronic mail (e-mail) 4030, and meeting minutes 4040. A second level 4100 comprises a set of various subtypes identified for the types listed in the first level 4000. For example, the invoice 4010 may have several subtypes, including a form A 4110, form B 4120, form C 4130 and form D 4140. In other implementations, other types and subtypes may be identified for the data received from data sources.

FIG. 1C is a block diagram that depicts various types of processing that may be performed on data received from data sources. FIG. 1C depicts the following types of processing: a data receipt processing 1550, an image characteristics analysis 1560, a word (text) characteristics analysis 1570, and a semantic characteristics analysis 1580. Depending on the implementation, some processing environments may be configured to perform all four types of processing 1550-1580, while other processing environments may be configured to perform some of 1550-1580, but not all. Some other processing environments may be configured to perform additional types of processing not depicted in FIG. 1C.

Data receipt processing 1550 comprises various types of processing, including receiving data from data sources, storing the received data, and notifying an IPC processor that the data was received. Data receipt processing 1550 may comprise testing a status of data input ports of data input devices, and upon detecting that data has been received on a particular data input port, receiving the data, determining a storage location for the data, sending the received data to the storage location and indicating to the IPC processor that the data has been received and stored. Upon receiving a message that data has been received, an IPC processor may initiate data conversion to one or more standard format data, and initiate an image characteristics analysis 1560, a word characteristics analysis 1570, and a semantic characteristics analysis 1580 of the data.

Image characteristics analysis 1560 comprises any type of processing leading to determining image characteristics of digital data. For example, performing image characteristics analysis 1560 of digital image data may allow determining a file type for the digital image data, and use the determined file type to identify one or more image characteristics of the digital data. The image characteristics may be transmitted to an IPC processor, which may use the image characteristics to determine one or more categories for the digital data.

A category indicates a type of the received image data. Example categories include, without limitation, an invoice, mail, email, meeting minutes, purchase receipt, filing receipt, marketing materials, an applications, disposition, request, confirmation, report, statistical data, and others.

A repertoire of the categories may vary from one company to another, and may depend on for example, the charter of the company. For example, a company that specializes in distributing printing devices may define a set of categories differently than a company that is a holding company. Also, a company that receives purchase invoices from a large group of vendors may define a set of categories differently than a company that receives purchase invoices from one or two vendors.

In some situations, a category may have sub-categories. For example, if a company receives purchase invoices from different vendors and the invoices from each vendor have different formats, then the company may determine that a main category is called an "invoice," and that the main category has several sub-categories, each for a different invoice format or form.

A category may be represented using a data object structure. A data object for a category may be represented as a data table, and may be stored in memory. The category data object may be referenced by a name of the data table or a pointer to some space allocated in the memory. An example of category data object is described in detail in FIG. 8, below.

Figure 8:
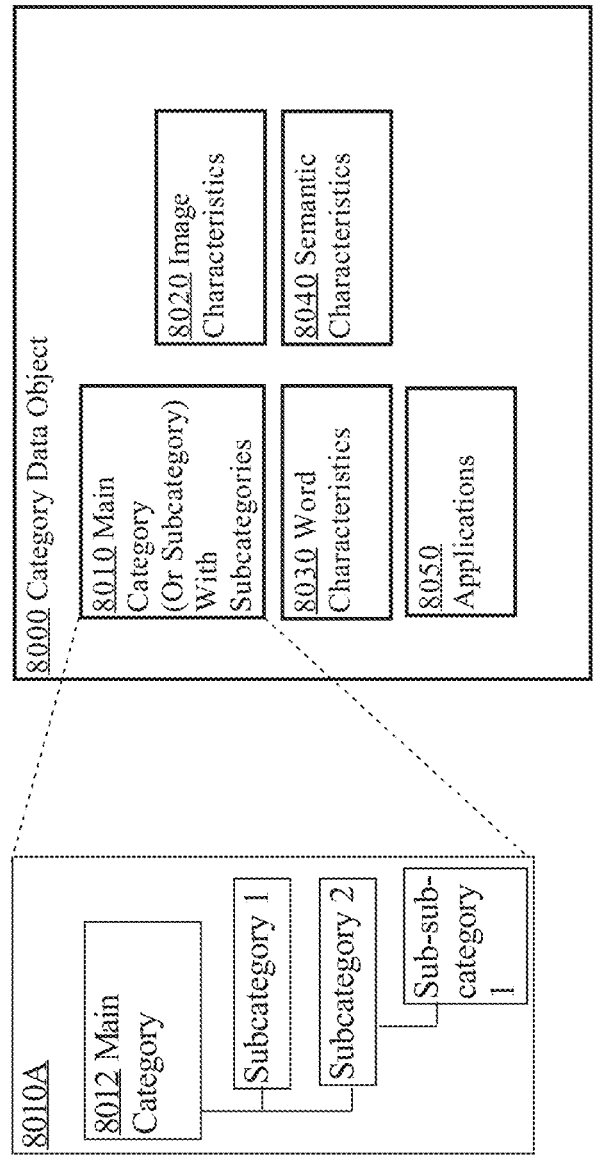
FIG. 8 is a block diagram that depicts an example category data object.

FIG. 8 is a block diagram that depicts an example of a category data object 8000. A category data object 8000 may be created for a main category or a sub-category. A main category (or a sub-category) may comprise sub-categories, image characteristics 8020, word characteristics 8030, semantic characteristics 8040 and applications 8050. In FIG. 8, the main category with its sub-categories (or the sub-category with its sub-categories) is depicted as element 8010.

A main category (or a sub-category) with its sub-categories 8010 may include parameter information about the name of the main category (or the name of the sub-category) and the references to the associated sub-categories. The references are stored in a linked list. If there is no associated sub-category, then the linked list has a zero-length.

Image characteristics 8020 may include any type of parameter information that is specific to digital data, and that may be identified from inspecting the digital data.

Word characteristics 8030 may include words and phrases indicative of digital data of the particular category. Word characteristics may be determined by performing an optical character recognition of training data of the particular category or analyzing the various standard text format data from various sources.

Semantic characteristics 8040 may include meanings of digital data of the particular category. Semantic characteristics may be determined by performing a semantic analysis of training data of the particular category or analysis of large volume of data from various sources.

Semantic analysis is a method for eliciting and representing meaning of digital data. By performing a semantic analysis, standard text format data is converted to standard semantic formal data, and additional information for the identified words is generated. For example, if the digital data comprises two sentences "The house caught up on fire" and "The employee was fired," then both sentences contain the same word "fire," yet the meaning of the word "fire" is different. Based on the semantic analysis of the sentences, the meaning of the word "fire" for each of the sentences may be determined, and the first sentence may be associated for example, with a "damage" category, while the second sentence may be associated with for example, a "human resource" category.

Performing a semantic analysis of digital data may be outsourced and performed by specialized software applications through various libraries or cloud interfaces. References to applications 8050 may include a linked list of links and pointers to a memory space, disk space or storage device used to store one or more applications to be used to further process the received digital data. For example, if a main category 8010 is an "invoice," then the application references 8050 may reference one or more applications that are to be used to process the invoices.

Referring again to FIG. 1C, word analysis 1570 comprises any type of processing leading to determining word characteristics of digital data. In particular, word analysis 1570 may start from identifying meaningful words in the received digital data. For example, word analysis 1570 of digital image data may perform an optical character recognition of the image, produce word data, and identify word characteristics of the word data. The optical character recognition of the digital data may be performed by an OCR processor 1050 depicted in FIG. 1A.

If the word analysis 1570 returned one or more word characteristics of the digital data, then the word characteristics may be transmitted to an IPC processor. The IPC processor may use the word characteristics to determine one or more categories for the data. If the one or more categories have been already determined based on for example, image characteristics of the data, then the IPC processor may use the word characteristics to refine the selection of the categories, determine additional categories, or determine sub-categories for the selected categories.

Semantic analysis 1580 comprises any type of processing leading to determining a meaning of the digital data. The semantic analysis 1580 may be performed independently of or in conjunction with word analysis 1570 and image characteristic analysis 1560. The semantic analysis 1580 may include processing of standard text format data, generating standard semantic format data, and determining one or more semantic characteristics of the standard semantic format data.

One of the objectives of a semantic analysis 1580 is to determine one or more semantic characteristics of the received data. The semantic characteristics may comprise words or phrases indicative of the meaning of the data. For instance, the semantic analysis 1580 may determine that the data pertains to a message from a manager to a human resource representative and contains performance review of a subordinate employee.

If the semantic analysis 1580 is successful and provided one or more semantic characteristics of the received data, then an IPC processor may use the semantic characteristics to determine one or more categories for the data. If the one or more categories have been already determined for the received data, then the IPC processor may use the semantic to refine the selection of the categories, to determine additional categories for the received data, or to determine sub-categories for the selected categories. Continuing with the above example, if during a word characteristics analysis, a main category called "Human Resources" has been identified and associated with the received message as a main category, a sub-category of the "Human Resources" and called a "Performance Issue" may be identified.

Once at least one category has been identified for the received data, an IPC processor may use the information about the category to determine one or more applications that are configured to further process the received data.

The various types of processing depicted in FIG. 1C are merely examples of the processing leading to determining one or more applications to be used to handle the received data. Additional types of processing may also be involved. For example, processing based on the probability theory or fuzzy logic theory may also be implemented to assist the decision making process.

Further, no specific order is required for performing the various types of analyses depicted in FIG. 1C. In some implementations, the processing 1550-1580 may be performed sequentially. In other implementations, some processes may be performed in parallel. In yet other implementations, only some of the processing 1550-1580 is performed.

B. Image Processing and Categorization

FIG. 1B is a block diagram that depicts an example of processing data received from various data sources. In FIG. 1B, the data may be received at image input 1110, digital input 1120, or both. For example, digital data, such as a JPEG image of an invoice, may be retrieved from a storage device 1112, and received at image input 1110. According to another example, digital data, such as a PDF file, may be retrieved from a storage device 1122 and received at digital input 1120.

Received digital image data may be converted to standard image format data and sent to IP processor 1020. IPC processor 1020 may use the standard image format data to determine one or more categories for the data. IPC processor 1020 may determine a category for the data based on image parameter values extracted from the data. If the extracted parameter value matches ninety nine parameter values out of a hundred parameter values of an "invoice" category, then the data may be classified as an "invoice" with a 99% confidence level. The confidence level may also be computed using weights associated with the parameter values.

Upon associating a category with received image data, IPC processor 1020 may determine one or more software applications that are configured to process the received digital data. For example, using information stored in association with the "invoice" category, IPC processor 1020 may retrieve references to one or more applications that are configured to process invoices.

Upon associating one or more categories and one or more references of applications with digital data, IPC processor 1020 may send the standard image format data and the associated information to a preprocessor 1200.

Preprocessor 1200 is configured to determine whether any preprocessing of the data is needed before the data may be ported to applications. If any preprocessing is needed, then preprocessor 1200 performs the preprocessing. For example, preprocessor 1200 may perform data translation, data format conversion, and other types of data preprocessing.

The preprocessed information may be sent to an application processor 1300, which provides an execution environment for processing the digital data. For example, if received digital data is an invoice document, and IPC processor 1020 identified a particular application that is to be used to process the invoice, then application processor 1300 initiates execution of the particular application and the processing of the invoice.

However, in some situations, upon receiving digital image data, IPC processor 1020 may be unable to determine any application configured to further process the received digital data, or IPC processor 1020 may unable to determine such an application with a certain level of confidence. That may occur when IPC processor 1020 is unable to collect a sufficient amount of information such as parameter values from the received digital image data, or the collected information does not indicate any of known categories with the certain level of confidence. In such situations, IPC processor 1020 may instruct an OCR processor 1050 to perform an optical character recognition of the digital data, and provide standard text format data with word characteristics to IPC processor 1020.

Furthermore, IPC processor 1020 may instruct a semantic analysis processor 1060 to perform a semantics analysis of the image data, and provide semantic characteristics to IPC processor 1020.

Once word characteristics or semantic characteristics (or both) are provided to IPC processor 1020, IPC processor 1020 may again attempt to determine one or more categories for the digital data. For example, IPC processor 1020 may try to find a match between the provided word characteristics of the digital data and one or more word characteristics associated with known categories, and upon finding a match, identify the category (or categories) for which the match was found. Similarly, if semantic characteristics of the digital data are provided, then IPC processor 1020 may try to find a match between the provided semantic characteristics of the digital data and one or more semantic characteristics associated with the categories, and upon finding a match, identify the category (or categories) for which the match was found.

Figure 9:
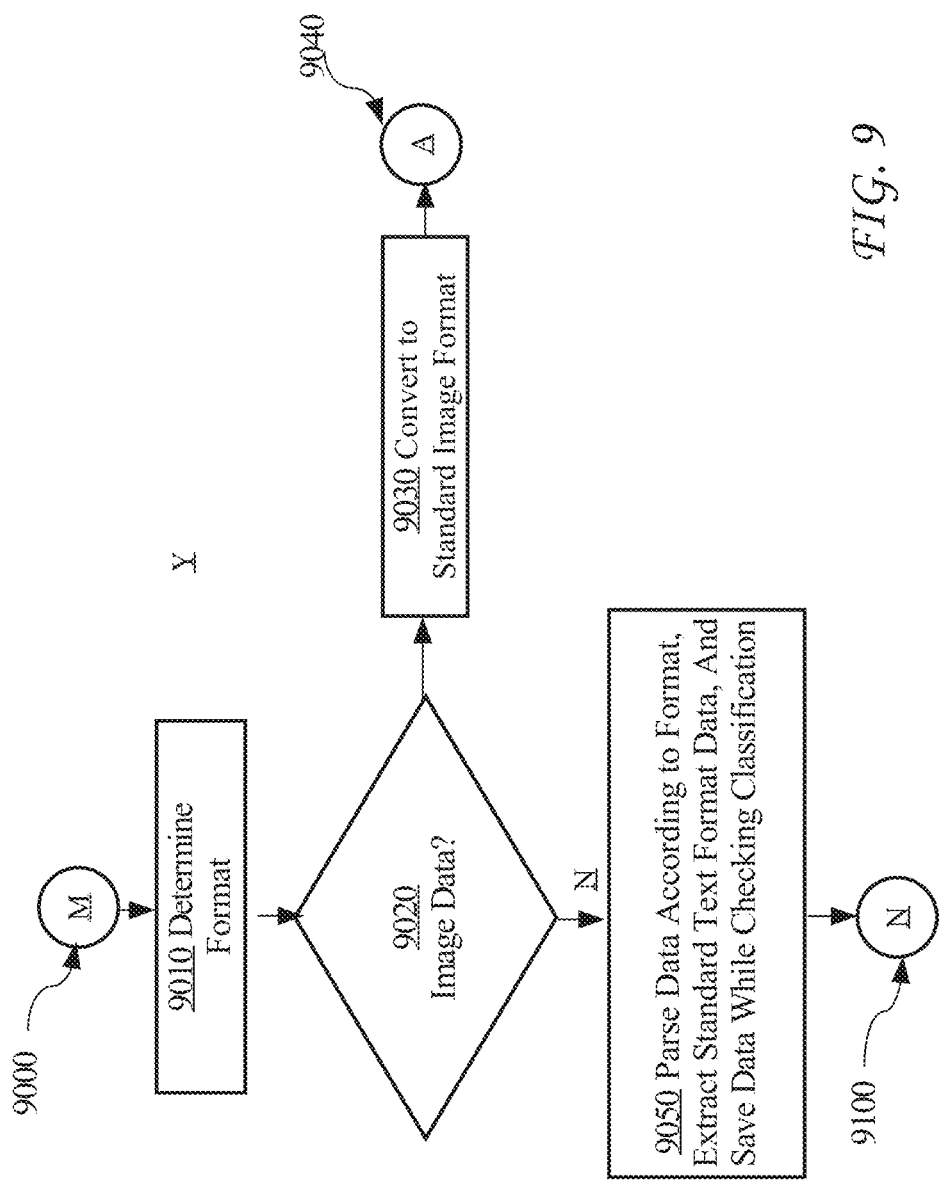
FIG. 9 is a flow diagram that depicts an example of digital data processing.

FIG. 9 is a flow diagram that depicts an example of digital data processing before the steps depicted in FIG. 2A-2B are executed. In step 9010, a format of received digital data is determined. The format of the digital data may be determined based on for example, the information included in a header or in a suffix of the received digital data. For example, the received data may have a file extension (suffix) as ".txt" or ".JPG."

In step 9020, it is determined whether the received digital data represents or comprises an image. If so, then in step 9030, the received digital data is converted to standard image format data, and the resulting standard image format data is provided to an entry A, depicted in FIG. 2A.

However, if the received digital data does not represent image data, then in step 9050, the received digital data is parsed, standard text format data is generated, and the resulting standard text format data, along with possible category identification, is provided to an entry B, depicted in FIG. 2A.

FIG. 2A-2B are flow diagrams that depict an example of processing data received from various data sources. There are two data inputs A 2000 and B 2010. The two inputs were described in FIG. 9, in which the two inputs are referenced as inputs A 9040 and B 9100, respectfully.

Referring first to FIG. 2A, in step 2020, data is received from a data source and stored as original data in a storage device. The data may be received as a hard copy of a document. In such a situation, the received hard copy may be scanned using a scanning device, and the scanning device may generate digital data of the document. The digital data may be stored in a storage device or in a cloud system.

Alternatively, data received from a data source may be already digital data. For example, the digital data may be an electronic mail sent from an email server.

In an embodiment, upon receiving digital data, a data structure may be created for the digital data in a storage device or in a cloud system. The data structure may be used to store the digital data and the information collected about the digital data or generated for the digital data. The data structure may comprise links to various characteristics of the digital data.

In an embodiment, the data structure is an information object created by an object-oriented software application. An example of the information data object is depicted in FIG. 3.

Figure 3:
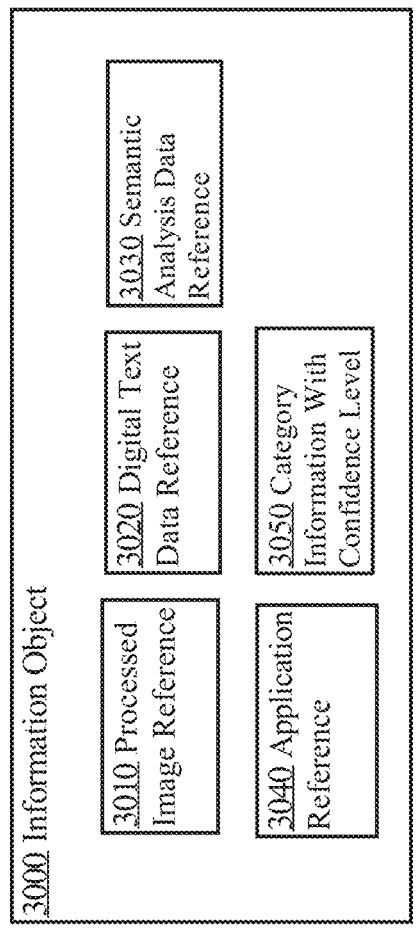
FIG. 3 is a block diagram that depicts an example information object.

FIG. 3 is an example information object 3000. The example depicted in FIG. 3 is merely one of many examples of data structures used to store information about digital data received from various sources.

An information object 3000 may be generated as an object-oriented data object, and may be used to store links or references to information related to digital data. In the example depicted in FIG. 3, an instantiated information object comprises a processed image reference 3010, a digital text data reference 3020, a semantic analysis data reference 3030, an application reference 3040, and category information with a confidence level 3050.

A processed image reference 3010 may be a link or a pointer to a memory space, disk space or a storage device used for storing processed image data represented in a standard image format and obtained in step 2030 of FIG. 2A. It may also be a link or a pointer to a disk space or to a storage device used for storing the digital data.

A digital text data reference 3020 may be a link or a pointer to a memory space, disk space or a storage device used for storing OCR results represented in a standard text format and obtained in the step 2070 of FIG. 2A.

A semantic analysis data reference 3030 may be a link or a pointer to a memory space, disk space or a storage device used for storing standard semantic format data generated by a semantic analysis processor.

An application reference 3040 may be a link or a pointer to a memory space, disk space or a storage device used for storing references to the applications configured for processing the received data.

A category information with a confidence level 3050 may be a link or a pointer to a memory space, disk space or a storage device used fir storing category information identified for the received data and confidence levels with which the categories were identified for the received data.

Referring again to FIG. 2A, in step 2030, if needed, received digital data is corrected. Correction of the digital data may be performed if the digital data contains some errors or problems. For example, if the digital data of a document was generated by a scanner by scanning a hard copy of a document, but the hard copy was fed to the scanner improperly, then, to improve a quality of the digital data, the image skew may be corrected, or data noise may be reduced. Once the correction of the digital data is completed, the corrected digital data may be stored in a storage device or in a cloud system, and a reference to the corrected digital data may be stored in a data object 3000 of FIG. 3.

In step 2040, image characteristics of the digital data are determined and matched with characteristics of known categories. Determining the image characteristics may be performed by processing corrected image data to extract parameters that are independent of a scale of the digital data. Those parameters may be used to characterize the image and to determine one or more categories for the digital data.

Matching the image characteristics of the digital data to the image characteristics of known categories may be performed by retrieving data structures that store information about the known categories. An example of such data structures is depicted in FIG. 8, above.

Referring again to FIG. 2A, in step 2060, the one or more categories identified in step 2050 and stored along with the corresponding confidence levels.

Associating a category with received digital data may be performed in many ways. For example, the association may be made by copying some of the information stored in a category data object 8000, depicted in FIG. 8, into an information data object 3000, depicted in FIG. 3. In particular, if an information data object 3000 has been created for the received digital data, and a main category 8010 of the category data object 8000 was found for the received digital data, then the reference to field 8010 may be copied to the linked list of field 3050 of the information data object 3000. Upon associating the category with the received digital data, the information data object 3000 for the digital data may be stored in a storage device or in a cloud system.

In step 2070, an optical character recognition of the digital data is performed. The OCR may be performed using an OCR processor 1050, depicted in FIG. 1A, or any other device configured to perform OCR. Performing OCR may involve converting image data to standard text format data and identifying word characteristics of the standard text format data. Then, the word characteristics may be sent to an IPC processor 1050 to identify categories for the digital data.

In step 2080, a determination is made whether one or more categories may be determined for the standard text format data. The determination may be made by finding a match between the word characteristics of the standard text format data and word characteristics of known categories. If a match is found, then the process proceeds to step 2090; otherwise the process proceeds to step 2100. An example of determining a category based on the word characteristics of the digital data is depicted in FIG. 10.

Figure 10:
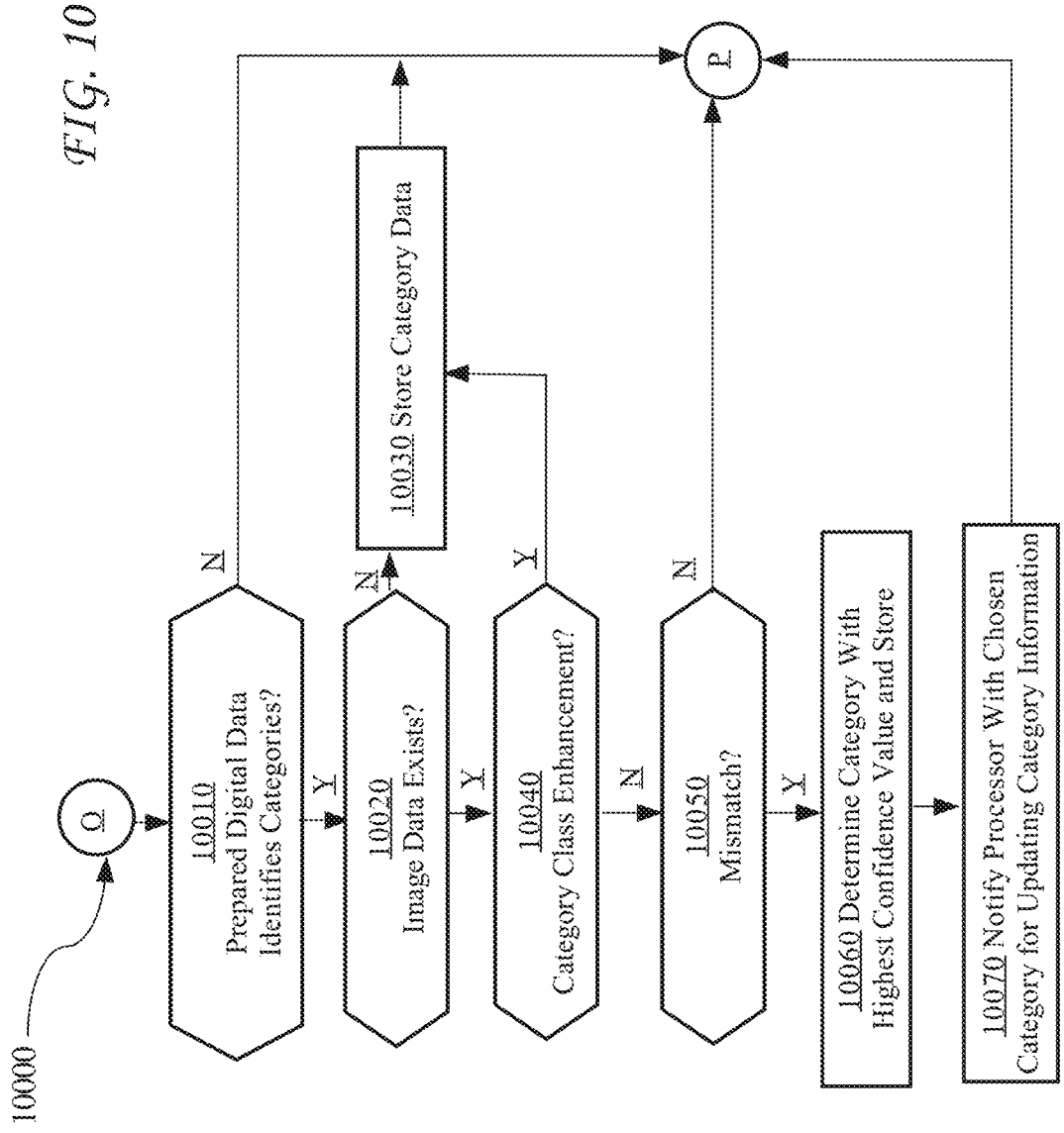
FIG. 10 is a flow diagram that depicts an example of determining one or more categories for standard text format data.

FIG. 10 is a flow diagram that depicts an example of determining one or more categories for standard text format data. In step 10010, a determination is made whether one or more categories may be identified from the standard text format data.

If at least one category is identified in step 10010, then a determination is made whether the image data is available.

If the image data is unavailable, then in step 10030, the identified category (or categories) is stored in an information data object created for the digital data.

However, if the image data is available, then in step 10040, a determination is made whether the identified category is an "enhancement," such as a new category or a sub-category. If the identified category is an enhancement, then in step 10030, the identified "enhancement" category (or categories) is stored in the information data object created for the digital data.

However, if the identified category is not an enhancement, then in step 10050, a determination is made whether there is a mismatch between the identified category and the categories previously identified for the digital data. If there is a mismatch, then in step 10060, the category with a higher confidence level is saved in data object created for the digital data, or used to replace the category with a lower confidence level in the data object. Furthermore, in step 10070, a notification is sent to an IPC processor to indicate that a category mismatch was encountered, and to request an update of the categorization process. In response to receiving the notification, a decision process log may be traced, the wrong decision node may be identified, and the decision process may be corrected so that a correct decision may be reached in the future.

However, if there is no mismatch, then the process of determining one or more categories for standard text format data ends.

Referring again to FIG. 2A, in step 2100, a determination is made whether, based on one or more categories identified for the received digital data, one or more applications configured to process the received digital data may be identified. For example, if a category "billing" has been identified for the received digital data, and one or more references to applications are stored in a "billing" category data object, then in step 2110, the one or more references to the application may be associated with the digital data created for the digital data. Otherwise, the process proceeds to step 2120.

Associating an application reference with received digital data may be performed in many ways. For example, the association may be made by copying some of the information stored in a category data object 8000, depicted in FIG. 8, to an information data object 3000, depicted in FIG. 3. In particular, if an information data object 3000 has been created for the received digital data, and a main category 8010 of the category data object 8000 was found as corresponding to the received digital data, then the application reference, stored in the reference field 8050, may be copied to the linked list of an application reference field 3040 of the information data object 3000. Upon associating the application reference with the received digital data, the information data object 3000 for the digital data may be stored in a storage device or in a cloud system.

In some situations, determining categories for digital data is difficult even if standard text format data for the digital data is available. In such a case, the standard text format data may be processed by semantic analysis processor 1060 of FIG. 1A, to generate semantic characteristics of the standard text format data. For example, semantic analysis processor 1060 may perform a semantics analysis of the standard text format data and determine one or more semantically coherent meanings of the digital data. The semantic characteristics of the digital data may be compared with the semantics characteristics of known categories, and if a match is found, then the matching categories may be associated with the digital data.

Referring again to FIG. 2A, in step 2120 a determination is made whether a semantic analysis of the digital data may be performed. A semantic analysis may not be performed if for example, a semantic analysis processor 1060 is unavailable, or the processing environment is not designed to support a semantic analysis processor, or the semantic analysis has been already performed. In such situations, the process proceeds to step 2140 of FIG. 2B. However, if a semantic analysis of the digital data may be performed, then the process proceeds to step 2130.

In step 2130, a semantic analysis of the digital data is performed to identify semantic characteristics of the digital data. Various examples of semantic analysis of the digital data have been provided above. The semantic characteristics of the digital data may be stored in an information data object, such as an information data object 3000 depicted in FIG. 3.

In step 2132, a determination is made whether the semantic characteristics of the digital data match any of the semantic characteristics of known categories. For example, if one of the semantic characteristics of the digital data is called an "insurance claim," and one of the semantic characteristics of a known category is also called an "insurance claim," then a match between the semantic characteristics of the digital data and the semantic characteristics of the known category is found. If the match is found, then the process proceeds to step 2134; otherwise the process proceeds to step 2140 of FIG. 2B.

In step 2134, category information maintained for the digital data is updated. The updating may be performed in the same fashion as it was performed in step 2090, described above.

In FIG. 2B, in step 2140, a determination is made whether one or more applications configured to process the received digital data may be identified based on one or more categories determined based on the semantic characteristics. If the one or more applications may be determined, then the process proceeds to step 2150; otherwise, the process proceeds to step 2160.

In step 2150, an application reference is associated with the received digital data. Associating an application reference with received digital data may be performed in many ways, including as it was described in step 2110 of FIG. 2A.

Referring again to FIG. 2B, once one or more application references are associated with the received digital data, an IPC processor may be invoked to initiate execution of the one or more applications. For example, if a reference of the application to be used to process insurance claims has been associated with the received digital data, then the IPC processor may initiate execution of the referenced application and processing of the insurance claims may start.

In step 2160, a determination is made whether any input from users may be helpful to correct category mismatches or other errors. For example, if after performing the image characteristics analysis, word characteristics analysis and semantic characteristics analysis for particular digital data, no category has been identified for the digital data, or no category has been identified with a certain level of confidence, then correcting information stored for the known categories or adding new categories may be recommended.

If any correction may be performed, then the process proceeds to step 2170, in which various modifications are performed. Examples of various modifications are depicted in FIG. 11.

C. Process Modifications

Figure 11:
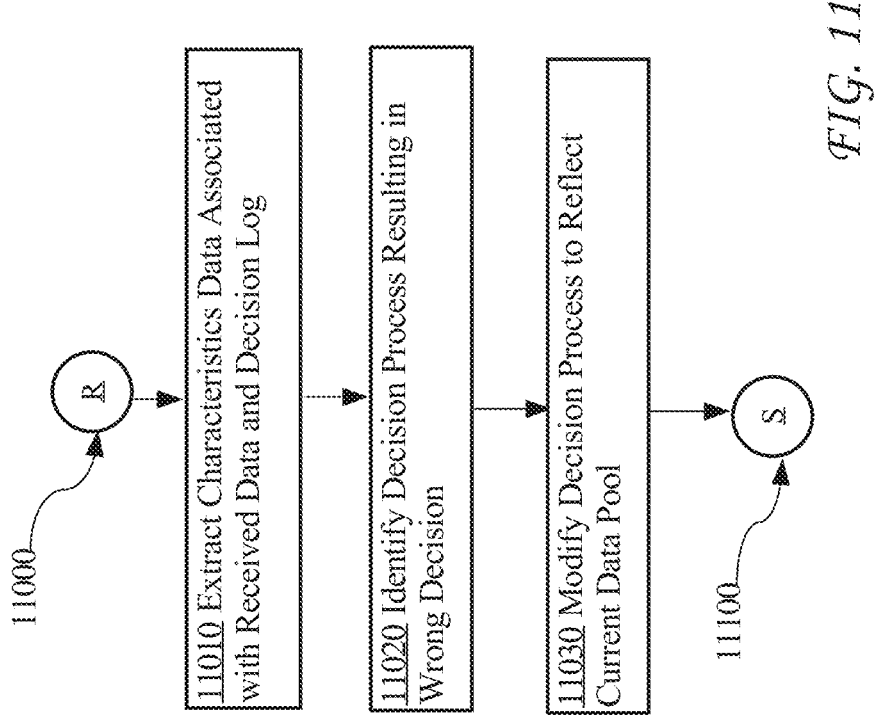
FIG. 11 is a flow diagram that depicts an example of process modifications.

FIG. 11 is a flow diagram that depicts an example of process modifications. Modifications to a data categorization process may be performed for a variety of reasons. For example, in some situations, even if all processes described in FIG. 1C are performed for the received digital data, no category can be determined for the data, or no category can be determined for the data with a certain level of confidence.

In step 11010, characteristics data associated with the received digital data and a decision log are extracted. Depending on their availability, the characteristics data may include image characteristics, word characteristics or semantic characteristics collected or obtained for the received digital data. A decision log may include a decision tree used to determine a category for the digital data.

In step 11020, based on the decision log, one or more decision processes that led to reaching a wrong decision are identified. For example, if the category or application references have been incorrectly assigned to the digital data, then the decision processes that led to the mismatch are identified.

In step 11030, the decision processes that led to reaching a wrong decision are modified. For example, if categories have been incorrectly assigned to the digital data, then the category assignment may be changed or modified to correct the wrong decision. The decision logic and process may be modified so that a correct decision may be made. According to another example, if application references have been incorrectly assigned to the digital data, then the reference assignments may be modified to correct the wrong assignments.

Furthermore, new categories and sub-categories may be added, or classifications of sub-categories for a given category may be modified. Moreover, image characteristics, word characteristics and semantic characteristics in the category data objects may be modified to support decision logic. Also, references to applications in the category data objects may be modified.

The modification may be performed manually or automatically. Also, the process of modifying the categorization process may be repeated multiple times or upon request.

D. Example of Processing Invoice Data Received from a Data Source

Figure 12:
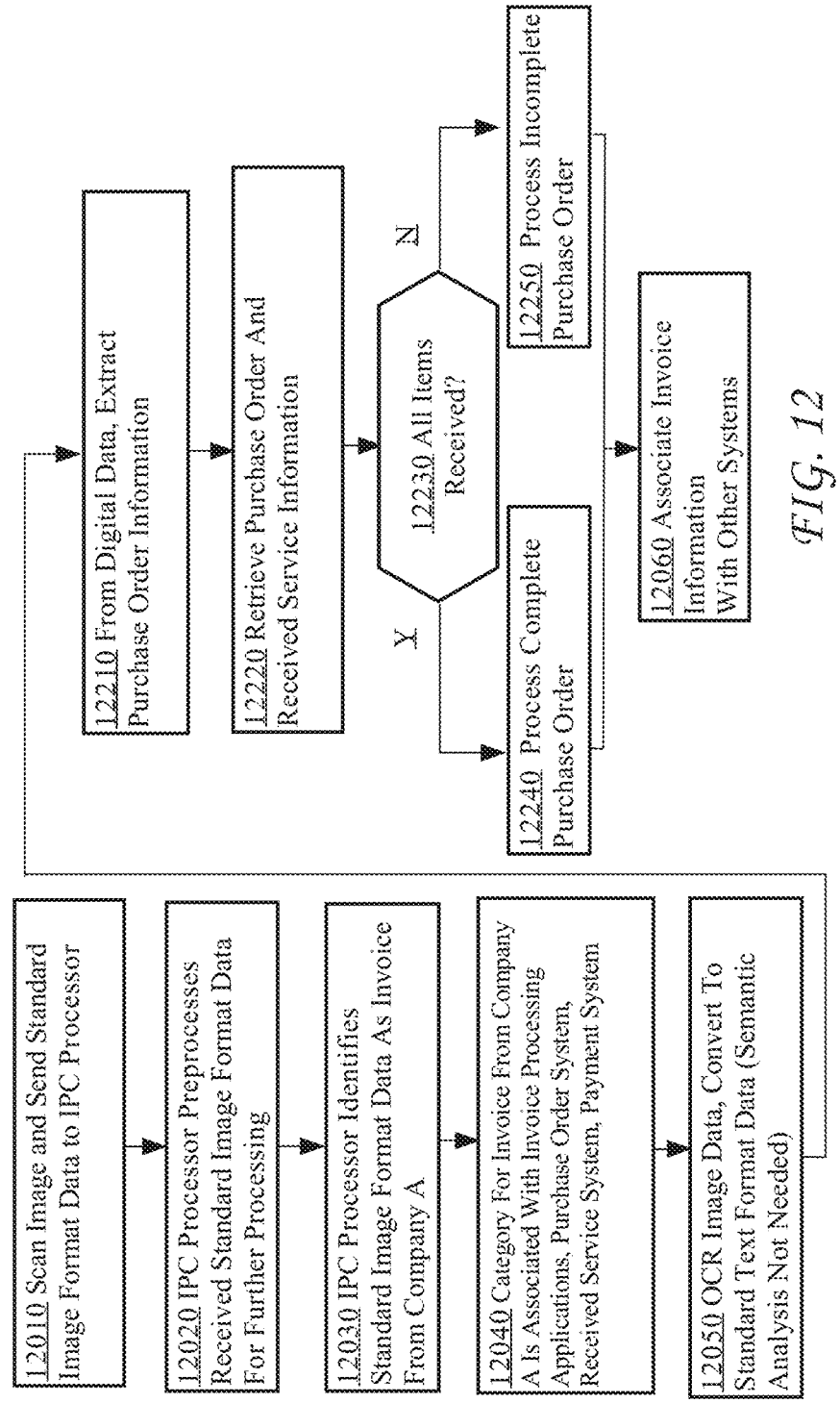
FIG. 12 is a flow diagram that depicts an example of processing invoice data received from a data source.

FIG. 12 is a flow diagram that depicts an example of processing invoice data received from a data source. In step 12010, a paper invoice was received from "Company A." The paper invoice was subsequently scanned to generate standard image format data, and the standard image format data of the scanned invoice was stored in a storage device for further preprocessing.

In step 12020, an IPC processor receives the standard image format data and preprocesses it for further processing. The preprocessing may include for example, removing data noise and correcting skew of the image.

In step 12030, an IPC processor identifies the standard image format data as an invoice from "Company A."

In step 12040, a category is determined for the standard image format data, and a determination is made that the category for the invoice from Company A is associated with one or more invoice processing applications, a purchase order system, a received service system and a payment system.

In step 12050, OCR on the standard image format data of the corrected data is performed to produce standard text format data.

In step 12210, purchase order information is extracted from the standard text format data.

In step 12220, the extracted purchase order information is used to retrieve a purchase order and received service information.

In step 12230, a determination is made whether all items for the purchaser order have been received. If all items have been received, then in step 12240, the complete purchase order is processed. However, if some items are missing, then in step 12250, the incomplete purchase order is processed. Processing of the incomplete purchase order may include sending a notice to a vendor to indicate that the order is incomplete and that the payment will be delayed until all items are provided. In some cases, depending upon the company's policy, the partial payment may be processed.

In step 12260, other applications are invoked to further process the results obtained or extracted in the previous steps. For example, if the partial payment is to be processed, then the database storing the purchase order and the payment history may be updated.

E. Category Editor

In an embodiment, an initial set of categories may be entered using a category editor. The category editor may also be used to edit the already entered categories, add new categories and sub-categories, and delete or rename some categories and sub-categories. An example of a category editor is depicted in FIG. 6.

Figure 6:
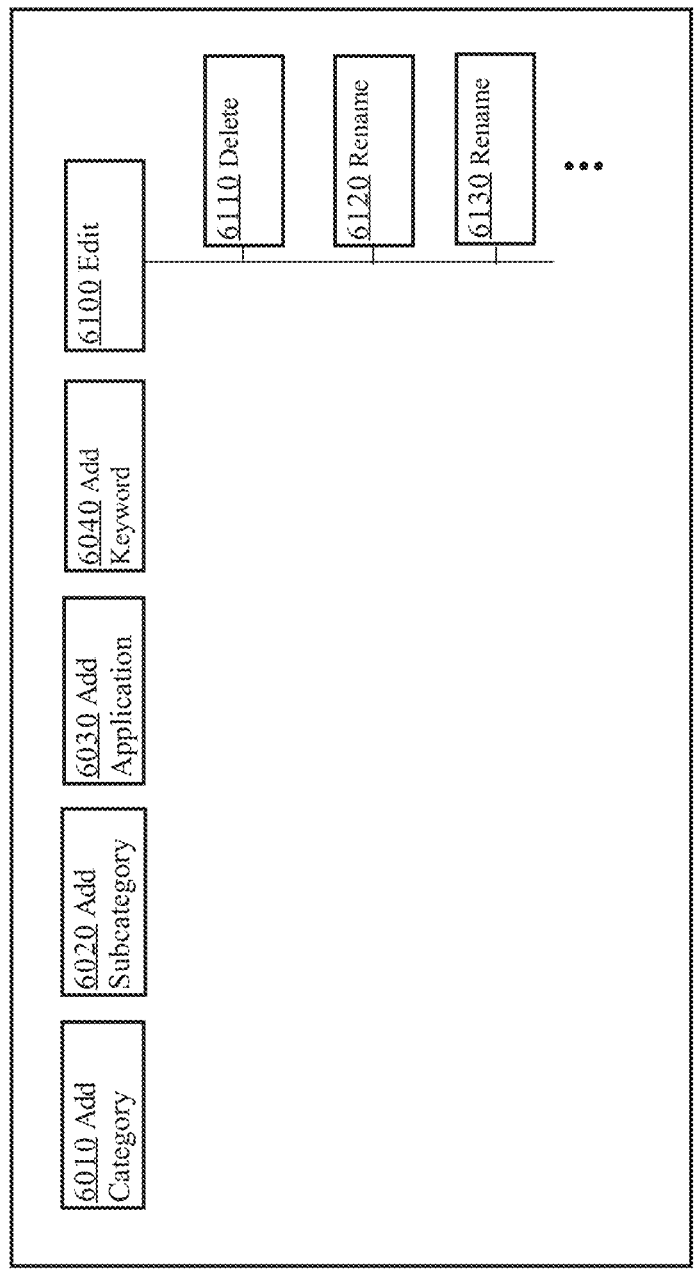
FIG. 6 is a block diagram that depicts an example category editor.

FIG. 6 depicts a user interface of an example category editor. The example depicts a simplified graphical user interface (GUI) of the category editor. Depending on the implementation, the design of GUI may vary. In the depicted example, the standard menu options such as a "File" option with a drop down menu containing sub-options such as "Open," "Save," "Save As," and so forth are omitted.

The depicted GUI comprises several buttons, such as an add category button 6010, an add sub-category button 6020, an add application button 6030, an add keyword button 6040, and an edit pull-down menu 6100. Add category button 6010 may be used to add a new category to a set of categories. Add sub-category button 6020 may be used to add a new sub-category for an existing category. Add application button 6030 may be used to add an application reference to a category data object defined for an existing category. Add application button 6030 has a drop-down menu for associating applications with the existing category and to disassociating applications from the existing category. Add keyword button 6040 may be used to add word characteristics. Edit pull-down menu 6100 may be used to edit the names of the categories, the names of the sub-categories and the application references. For example, upon selecting the edit pull-down menu 6100, additional buttons may be displayed. The additional buttons may include a delete category button 6110, a rename button 6120, a rename button 6130, and other buttons not depicted in FIG. 6.

F. Training Process

Training process for generating an initial set of categories and sub-categories may be performed using a sample of training data. In some implementations, the training process may be performed using a large sample of training data. The training process may involve receiving a large sample of training data, determining word characteristics and semantic characteristics of the training data and storing the characteristics in data structures. For example, the training data may be first ported to an input point B 2010, depicted in FIG. 2A, word characteristics and semantic characteristics of the training data may be automatically extracted or determined, and the characteristics may be stored in data structures such as an information object 3000, depicted in FIG. 3.

Figure 7:
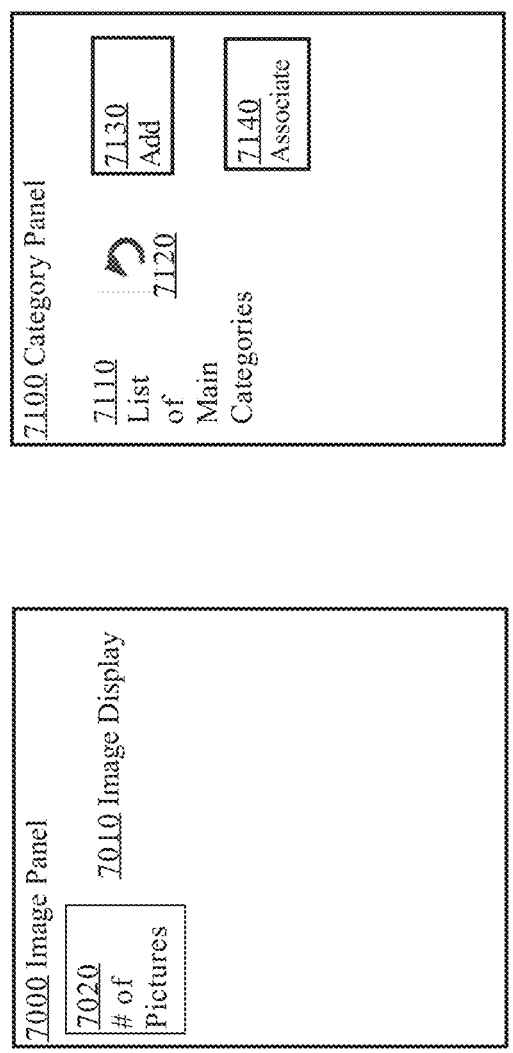
FIG. 7 is a block diagram that depicts a category training process.

FIG. 7 is a block diagram that depicts a category training process. The example depicts a simplified GUI of the category editor for associating images with categories. Depending on the implementation, the designs of GUI may vary. In the depicted example, the standard menu options such as a "File" option with a drop down menu containing sub-options such as "Open," "Save," "Save As," and so forth are omitted.

The depicted GUI comprises two panels: an image panel 7000 and a category panel 7100. In the image panel 7000, a subpanel 7020 may be displayed. The subpanel 7020 may be used to display the number of images to be shown in image display 7010.

A category panel 7100 may have several buttons, including a list of main category button 7110, a return button 7120, an add button 7130 and an associate button 7140. A list of main category button 7110 is a drop-down menu, which, once selected, causes generating a list of already known main categories and displaying the list in the category panel. If a category has sub-categories, then a '+' sign may be displayed to the left of the main category. When a user selects the main category, the sub-categories may be displayed. When the user selects a button 7120, the display returns to the previous display. An associate button 7140 allows associating the image with the selected main category or with the selected sub-category. An add button 7130 is used to associate more than one categories with the image.

A training process for the categories may start from opening an image data file using a "File Open" option from the GUI's menu. Upon selecting the "File Open" option, a list of images represented in a standard image format may be displayed. The list of images may be generated off-line by scanning for example, invoice samples received from various companies and storing the scanned data as standard image format data.

Upon selecting a name of a particular image set, several images may be displayed in a panel 7010. The quantity of the displayed images is indicated in an indicator 7020. From the image display of the particular image, a user who trains the system may collect certain characteristics of the particular image, and use those characteristics to determine whether any of the categories listed in a drop-down list of categories in 7110 may be associated with the particular image. The user may scroll down through the list of the categories 7110, and upon selecting a particular category from the list, the name of the category (and additional information about the category) may be highlighted.

Once the user finds (or defines) a particular category that is suitable for a particular image, the user may associate the particular category with the particular image by selecting an "associate" button 7140. The association may be saved in an information data object created for the particular image.

The user may also create additional associations using an add button 7130.

The association may be edited by selecting an edit button of the main menu, not shown in FIG. 7.

The presented approach for processing and categorizing data received from various data sources overcomes the obstacles identified in the background section, above. For example, the presented approach allows processing and categorizing the received data regardless of the data type, format, source, purpose or readability.

The approach allows streamlining the processing of the data provided by a variety of heterogenic data sources, and overcomes the incompatibilities problems with which the companies need to deal nowadays.

Furthermore, the approach allows matching various processing applications with various incoming documents regardless of the type of the data source that provided the incoming documents. The approach may be easily modified to include new types of the received data, new processing applications, new categories and sub-categories of the received data and new processing steps.

Moreover, the approach allows determining the type of processing for electronic data received from an entity based on login information provided by the entity, and based on historical data stored for the entity in a knowledge database of a data processing system. The login information may be provided to the data processing system as a user or a customer logins to a portal of the data processing system on behalf of the entity. The data processing system may use the login information to determine the type of processing for the electronic data received from the entity. The processing may include executing one or more services provided by one or more service providers capable of processing the electronic data received from the entity. The type of services that one or more service providers are to provide to each of entities may be specified in contracts, contents of which may be encoded in a knowledge database. The knowledge database may also contain information about history logs of the services used by the entities in the past. The knowledge database may be created, trained and modified as contract information becomes available and requests from the entities for requests are received.

XII. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
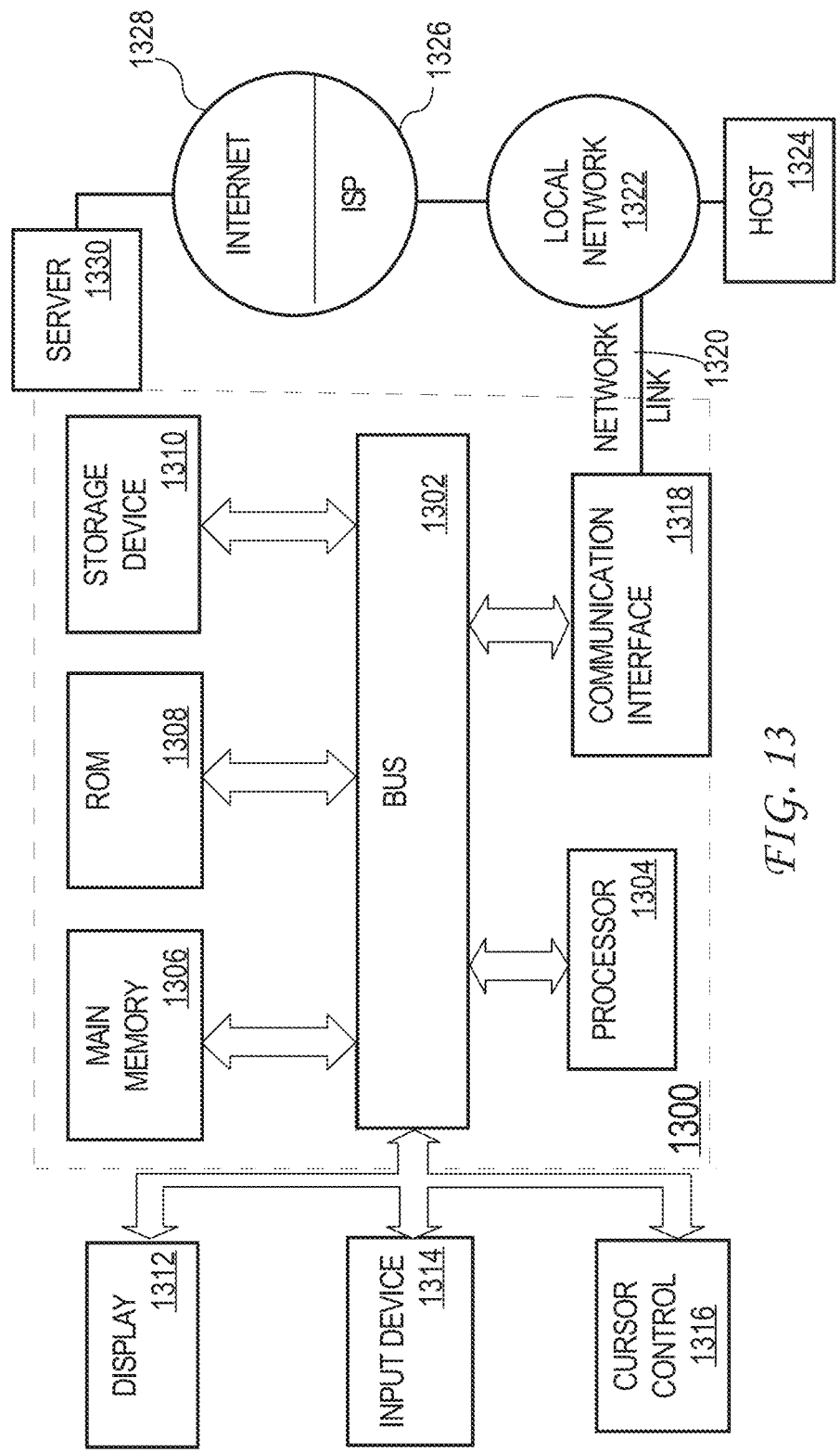
FIG. 13 is a block diagram that depicts an example computer system upon which embodiments may be implemented.

For example, FIG. 13 is a block diagram that illustrates a computer system 1300 upon which an embodiment of the approach may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions to implement embodiments described herein. Thus, embodiments are not limited to any specific combination of hardware circuitry and software.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be G4 LTE card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. An apparatus comprising:
one or more processors; and
one or more memories storing instructions which, when processed by the one or more processors, cause:
an electronic image processing and categorization (IPC) processor executing on the apparatus to receive a request and digital data from a data source;
the electronic IPC processor executing on the apparatus to analyze the digital data received from the data source to identify a particular user that sent the digital data;
retrieving, from a knowledge database, a particular association record stored for the particular user;
wherein the particular association record comprises a name of a particular agreement and a name of a particular service provider who provides services to the particular user, and indicates an application prior usage history of services provided by the particular service provider to the particular user;
the electronic IPC processor executing on an apparatus to automatically select, based on (1) the digital data received from the data source, (2) the application prior usage history of services provided for the particular user, and (3) the particular agreement, a particular processing application for processing the digital data from a plurality of processing applications that are capable of processing the digital data;
the electronic IPC processor executing on the apparatus to generate text data by converting the digital data into the text data;
the electronic IPC processor executing on the apparatus to extract particular information from the text data that is required by the particular processing application;
the electronic IPC processor executing on the apparatus to initiate execution of the particular processing application to cause the particular processing application to:
determine whether the particular information extracted from the text data includes all items for completing the request;
in response to determining that the particular information extracted from the text data includes all items for completing the request, complete the request; and
in response to determining that the particular information extracted from the text data does not include all items for completing the request, send a notification indicating that the request is incomplete.

2. The apparatus of claim 1, wherein the particular agreement is a contract wherein the application prior usage history maintained for the particular user is generated based on contract information provided in the contract binding the particular user and the particular service provider that hosts the electronic IPC processor.

3. The apparatus of claim 1, wherein the particular agreement is a contract; wherein the application prior usage history maintained for the particular user is generated based on contract information provided in one or more contracts binding the particular user and one or more service providers for providing one or more services involving one or more processing applications and one or more forms.

4. The apparatus of claim 1, wherein the electronic IPC processor receives the digital data from one or more devices or one or more cloud systems; and
wherein the electronic IPC processor is configured to process the digital data by performing one or more of:
categorizing the digital data into one or more categories based on information included in the application prior usage history maintained for the particular user, or associating one or more categories to the digital data based on the information included in the application prior usage history maintained for the particular user.

5. The apparatus of claim 1, wherein the particular user includes one or more of: a person, a group of persons, a department, an organization, an entity, a company, or an association.

6. The apparatus of claim 1, wherein the digital data is obtained by scanning a document provided in a paper form, and generating the digital data based on information included in the paper form.

7. The apparatus of claim 1, wherein the digital data is preprocessed by removing noise data and correcting skew of the digital data.

8. A method comprising:
receiving, by an electronic image processing and categorization (IPC) processor, a request and digital data from a data source;
analyzing the digital data received from the data source to identify a particular user that sent the digital data;
retrieving, from a knowledge database, a particular association record stored for the particular user;
wherein the particular association record comprises a name of a particular agreement and a name of a particular service provider who provides services to the particular user, and indicates an application prior usage history of services provided by the particular service provider to the particular user;
the electronic IPC processor executing on an apparatus to automatically select, based on (1) the digital data received from the data source, (2) the application prior usage history of services provided for the particular user, and (3) the particular agreement, a particular processing application for processing the digital data from a plurality of processing applications that are capable of processing the digital data;
generating text data by converting the digital data into the text data;
extracting particular information from the text data that is required by the particular processing application;
initiating execution of the particular processing application to cause the particular processing application to:
determine whether the particular information extracted from the text data includes all items for completing the request;
in response to determining that the particular information extracted from the text data includes all items for completing the request, complete the request; and
in response to determining that the particular information extracted from the text data does not include all items for completing the request, send a notification to indicate that the request is incomplete.

9. The method of claim 8, wherein the particular agreement is a contract; wherein the application prior usage history maintained for the particular user is generated based on contract information provided in the contract binding the particular user and the particular service provider that hosts the electronic IPC processor.

10. The method of claim 8, wherein the particular agreement is a contract; wherein the application prior usage history maintained for the particular user is generated based on contract information provided in one or more contracts binding the particular user and one or more service providers for providing one or more services involving one or more processing applications and one or more forms.

11. The method of claim 8, wherein the digital data is received by the electronic IPC processor from one or more devices or one or more cloud systems; and
wherein the electronic IPC processor is configured to process the digital data by performing one or more: categorizing the digital data into one or more categories based on information included in the application prior usage history maintained for the particular user, or associating one or more categories to the digital data based on the information included in the application prior usage history maintained for the particular user.

12. The method of claim 8, wherein the particular user includes one or more of: a person, a group of persons, a department, an organization, an entity, a company, or an association.

13. The method of claim 8, wherein the digital data is obtained by scanning a document provided in a paper form, and generating the digital data based on information included in the paper form.

14. The method of claim 8, wherein the digital data is preprocessed by removing noise data and correcting skew of the digital data.

15. A non-transitory computer-readable storage medium storing one or more sequences of instructions which, when executed by one or more processors, cause:
receiving, at electronic image processing and categorization (IPC) processor, a request and digital data from a data source;
analyzing the digital data received from the data source to identify a particular user that sent the digital data;
retrieving, from a knowledge database, a particular association record stored for the particular user;
wherein the particular association record comprises a name of a particular agreement and a name of a particular service provider who provides services to the particular user, and indicates an application prior usage history of services provided by the particular service provider to the particular user;
the electronic IPC processor executing on an apparatus to automatically select, based on (1) the digital data received from the data source, (2) the application prior usage history of services provided for the particular user, and (3) the particular agreement, a particular processing application for processing the digital data from a plurality of processing applications that are capable of processing the digital data;
generating text data by converting the digital data into the text data;
extracting particular information from the text data that is required by the particular processing application;
initiating execution of the particular processing application to cause the particular processing application to:
determine whether the particular information extracted from the text data includes all items for completing the request;
in response to determining that the particular information extracted from the text data includes all items for completing the request, complete the request; and
in response to determining that the particular information extracted from the text data does not include all items for completing the request, send a notification to indicate that the request is incomplete.

16. The non-transitory computer-readable storage medium of claim 15, wherein the particular agreement is a contract wherein the application prior usage history maintained for the particular user is generated based on contract information provided in the contract binding the particular user and the particular service provider that hosts the electronic IPC processor.

17. The non-transitory computer-readable storage medium of claim 15, wherein the particular agreement is a contract wherein the application prior usage history maintained for the particular user is generated based on contract information provided in one or more contracts binding the particular user and one or more service providers for providing one or more services involving one or more processing applications and one or more forms.

18. The non-transitory computer-readable storage medium of claim 15, wherein the digital data is received by the electronic IPC processor from one or more devices or one or more cloud systems; and
   wherein the electronic IPC processor is configured to process the digital data by one or more: categorizing the digital data into one or more categories based on information included in the application prior usage history maintained for the particular user, or associating one or more categories to the digital data based on the information included in the application prior usage history maintained for the particular user.

19. The non-transitory computer-readable storage medium of claim 15, wherein the particular user includes one or more of: a person, a group of persons, a department, an organization, an entity, a company, or an association.

20. The non-transitory computer-readable storage medium of claim 15, wherein the digital data is obtained by scanning a document provided in a paper form, and generating the digital data based on information included in the paper form.

* * * * *

UNITED STATES PATENT AND TRADEMARK OFFICE
CERTIFICATE OF CORRECTION

PATENT NO. : 10,798,078 B2
APPLICATION NO. : 15/476525
DATED : October 6, 2020
INVENTOR(S) : Tetsuro Motoyama Page 1 of 1

It is certified that error appears in the above-identified patent and that said Letters Patent is hereby corrected as shown below:

In the Claims

Claim 1, Column 36, Line 20, replace "an" with --the--.

Claim 16, Column 38, Line 66, after "contract" insert --;--.

Signed and Sealed this
Fifth Day of January, 2021

Andrei Iancu
*Director of the United States Patent and Trademark Office*